(12) United States Patent
Mahmud

(10) Patent No.: US 12,164,943 B1
(45) Date of Patent: Dec. 10, 2024

(54) METHOD AND SYSTEM FOR SYSTEMATIC ENHANCEMENT OF HUMAN INTERACTION CAPABILITIES VIA DYNAMIC USER INTERFACE MANAGEMENT

(71) Applicant: Taher Mahmud, London (GB)

(72) Inventor: Taher Mahmud, London (GB)

(73) Assignee: THE LONDON OSTEOPOROSIS CLINIC LIMITED, London (GB)

( * ) Notice: Subject to any disclaimer, the term of this patent is extended or adjusted under 35 U.S.C. 154(b) by 0 days.

(21) Appl. No.: 18/219,910

(22) Filed: Jul. 10, 2023

(51) Int. Cl.
G06F 9/451 (2018.01)
G06F 3/0482 (2013.01)
G06F 3/04845 (2022.01)

(52) U.S. Cl.
CPC ............ G06F 9/452 (2018.02); G06F 3/0482 (2013.01); G06F 3/04845 (2013.01)

(58) Field of Classification Search
CPC . G06F 9/452; G06F 9/451; G06F 9/44; G06F 3/0482; G06F 3/0481; G06F 3/04845; G06F 3/0484; G06N 20/00
USPC ................ 715/764, 765, 788, 825, 762, 744
See application file for complete search history.

(56) References Cited

U.S. PATENT DOCUMENTS

| | | | | |
|---|---|---|---|---|
| 10,467,029 | B1 * | 11/2019 | Lin | G06F 9/451 |
| 11,520,947 | B1 * | 12/2022 | Serackis | G06F 9/451 |
| 2005/0096973 | A1 | 5/2005 | Heyse | |
| 2010/0088654 | A1 * | 4/2010 | Henhoeffer | G06F 3/04883 |
| | | | | 715/863 |
| 2011/0234498 | A1 * | 9/2011 | Gray | G06F 3/041 |
| | | | | 345/168 |
| 2013/0311411 | A1 * | 11/2013 | Senanayake | G06F 16/90328 |
| | | | | 703/22 |
| 2014/0282052 | A1 * | 9/2014 | Stone | G06F 9/451 |
| | | | | 715/744 |

(Continued)

FOREIGN PATENT DOCUMENTS

WO 2023/038998 A1 3/2023

OTHER PUBLICATIONS

Mikami et al., "GUI Automatic Generation System by using Fuzzy Inference", 2013 IEEE 2nd Global Conference on Consumer Electronics, Oct. 2013, pp. 78-80. (Year: 2013).*

(Continued)

*Primary Examiner* — Hwei-Min Lu
(74) *Attorney, Agent, or Firm* — Caldwell Intellectual Property Law

(57) ABSTRACT

In an aspect a system for dynamic user interface generation includes a computing device configured to capture user interaction data from an engagement module on the user interface, to receive server feedback data, to determine a current user interface state as a function of the captured user interaction data and the received server feedback data, to predict an optimal user interface state as a function of the user interaction data and the server feedback data, and to generate an updated display data structure based on the predicted optimal user interface state, and to configure a remote computing device is configured to receive further user interaction data from the user. The computing device then updates the display data structure and consequently the user interface as a function of the further user interaction data.

20 Claims, 8 Drawing Sheets

(56) References Cited

U.S. PATENT DOCUMENTS

| | | | | |
|---|---|---|---|---|
| 2014/0372344 | A1* | 12/2014 | Morris | G06N 5/02 |
| | | | | 706/11 |
| 2015/0234518 | A1* | 8/2015 | Teller | G06F 3/011 |
| | | | | 345/173 |
| 2017/0070560 | A1* | 3/2017 | Eng | H04N 21/4402 |
| 2017/0212650 | A1* | 7/2017 | Sinyagin | G06F 9/453 |
| 2017/0263144 | A1 | 9/2017 | Horan | |
| 2017/0344631 | A1* | 11/2017 | Thirumalai-Anandanpillai | |
| | | | | G06F 16/3344 |
| 2018/0365025 | A1* | 12/2018 | Almecija | G06F 3/0482 |
| 2019/0074081 | A1 | 3/2019 | Easton | |
| 2020/0134388 | A1* | 4/2020 | Rohde | G06F 40/14 |
| 2021/0349587 | A1* | 11/2021 | Bigham | G06F 3/04886 |
| 2022/0091713 | A1* | 3/2022 | Le | G06F 9/451 |
| 2022/0091726 | A1* | 3/2022 | Azmoon | G06N 20/00 |
| 2023/0004988 | A1* | 1/2023 | Bhatt | G06N 20/00 |
| 2023/0086465 | A1* | 3/2023 | Morin | G06F 3/0481 |
| | | | | 715/789 |

OTHER PUBLICATIONS

Oulasvirta et al., "Combinatorial Optimization of Graphical User Interface Designs", Proceedings of the IEEE, vol. 108, No. 3, Feb. 17, 2020, pp. 434-464. (Year: 2020).*

* cited by examiner

US 12,164,943 B1

METHOD AND SYSTEM FOR SYSTEMATIC ENHANCEMENT OF HUMAN INTERACTION CAPABILITIES VIA DYNAMIC USER INTERFACE MANAGEMENT

FIELD OF THE INVENTION

The present invention generally relates to the field of user interfaces. In particular, the present invention is directed to methods and systems for dynamic user interface generation and management.

BACKGROUND

The field of interactive digital systems, and more specifically user interface design, has seen significant evolution over the past few decades. Traditional static interfaces have given way to more dynamic, interactive, and user-centric designs, driven by advancements in technology and growing user expectations for personalized and intuitive experiences. However, designing these dynamic user interfaces is a complex task, often requiring significant time and resources. This is mainly due to the diversity of user behaviors, preferences, and interaction patterns, which can vary significantly across different individuals and contexts. Current methodologies for user interface design and optimization largely rely on manual processes, such as user research, prototyping, and usability testing. These methods, while valuable, often fail to capture the full range of user interactions and responses in real-time, making it difficult to predict and adapt to user needs accurately and efficiently. As such, there is a growing need for systems and methods that can automatically generate and optimize user interfaces based on real-time user interaction data. Such systems would significantly streamline the user interface design process, while also enhancing user satisfaction and engagement by providing personalized and intuitive interfaces.

SUMMARY OF THE DISCLOSURE

In an aspect, the invention provides a system for dynamic user interface generation and management which includes at least a computer device. The computer device is configured to capture user interaction data from an engagement module on the user interface. This data is then analyzed, incorporating server feedback data in order to determine a current user interface state. The system further includes a machine learning model that predicts an optimal user interface state as a function of the user interaction data and the server feedback data. This prediction process utilizes training data that correlates user interaction data with different states of the user interface. The computer device subsequently generates an updated display data structure based on the predicted optimal user interface state, the captured user interaction data, and the current user interface state. The updated user interface is then displayed on a remote computing device for the user to interact with. The system further receives additional user interaction data through the remote computing device and updates the display data structure, and consequently the user interface, as a function of this additional user interaction data. This enables the dynamic and real-time adaptation of the user interface based on user behavior and feedback, enhancing user engagement and satisfaction.

In another aspect, a method of dynamic user interface generation is disclosed. The method includes capturing, through an engagement module, user interaction data from a user interface. The method includes receiving, at a computing device, feedback data. The method includes determining, at the computing device, a current user interface state as a function of the user interaction data and the server feedback data. The method includes predicting, at the at the computing device, an optimal user interface state as a function of the user interaction data and the current user interface state, wherein predicting further comprises receiving training data, wherein training data correlates user interaction data and server feedback data to states of the user interfaces, training a user interface adaptation machine learning process with the training data and predicting the optimal user interface state as a function of the user interaction data and server feedback date. The method includes generating, at the computing device, an updated display data structure for the user, as a function of the predicted optimal user interface state, the captured user interaction data, and the current user interface state. The method includes displaying the updated user interface of a remote computing device. The method includes receiving, through the remote computing device, further user interaction data. The method includes updating, the display data structure and consequently the user interface as a function of the further user interaction data.

These and other aspects and features of non-limiting embodiments of the present invention will become apparent to those skilled in the art upon review of the following description of specific non-limiting embodiments of the invention in conjunction with the accompanying drawings.

BRIEF DESCRIPTION OF THE DRAWINGS

For the purpose of illustrating the invention, the drawings show aspects of one or more embodiments of the invention. However, it should be understood that the present invention is not limited to the precise arrangements and instrumentalities shown in the drawings, wherein.

Figure 1:
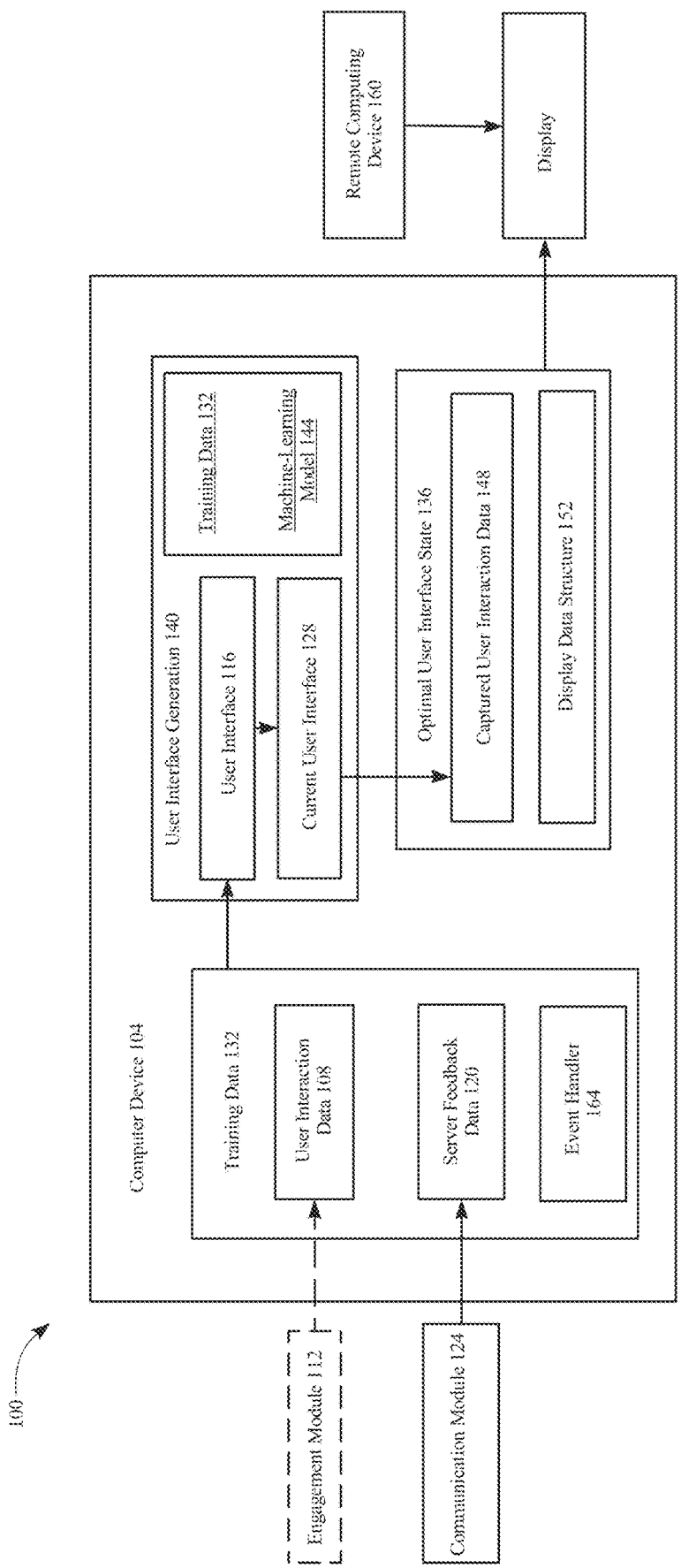
FIG. 1 is a block diagram illustrating a system of dynamic user interface generation.

The drawings are not necessarily to scale and may be illustrated by phantom lines, diagrammatic representations, and fragmentary views. In certain instances, details that are not necessary for an understanding of the embodiments or that render other details difficult to perceive may have been omitted.

DETAILED DESCRIPTION

Described herein is a system for dynamic user interface generation. A computer device may be configured to capture user interaction data of a user from an engagement module. A computer device may be configured to receive server feedback data through a communication module. A computer device may be configured to determine a current user interface state as a function of the captured user interaction data and the server feedback data. A computing device may be configured to predict an optimal user interface state as a function of the user interaction data and the current user interface state, wherein predicting comprises receiving training data, training a user interface generation machine-learning model, and predicting the optimal user interface state. A computer device may be configured to generate as a function of the predicted optimal user interface state. A computer device may be configured to display the updated user interface to the user on an interactive graphical user interface of a remote computing device. A computer device may be configured to receive through a remote computing device. A computer device may be configured to update the display structure and consequently the user interface as a function of the further user interaction data.

Described herein is a method of dynamic user interface generation. A method may include capturing, through an engagement module, user interaction data from a user interface. A method may include receiving, at a computing device, server feedback data. A method may include determining, at the computing device, a current user interface state as a function of the user interaction data and the server feedback data. The method may include predicting, at the computing device, an optimal user interface state as a function of the user interaction data and the current user interface state. Predicting may include receiving training data, wherein training data correlates user interaction data and server feedback data to states of the user interfaces. Predicting may include training a user interface adaptation machine learning process with the training data. Predicting May include predicting the optimal user interface state as a function of the user interaction data and server feedback date. A method may include generating, at the computing device, an updated display data structure for the user, as a function of the predicted optimal user interface state, the captured user interaction data, and the current user interface state. A method may include displaying the updated user interface of a remote computing device. A method may include receiving, through the remote computing device, further user interaction data. A method may include updating, the display data structure and consequently the user interface as a function of the further user interaction data.

Referring now to FIG. 1, an exemplary embodiment of a system 100 for dynamic user interface generation is illustrated. System 100 may include a computing device 104. Computing device 104 may include any computing device as described in this disclosure, including without limitation a microcontroller, microprocessor, digital signal processor (DSP) and/or system on a chip (SoC) as described in this disclosure. Computing device 104 may include, be included in, and/or communicate with a mobile device such as a mobile telephone or smartphone. Computing device 104 may include a single computing device operating independently, or may include two or more computing device operating in concert, in parallel, sequentially or the like; two or more computing devices may be included together in a single computing device or in two or more computing devices. Computing device 104 may interface or communicate with one or more additional devices as described below in further detail via a network interface device. Network interface device may be utilized for connecting computing device 104 to one or more of a variety of networks, and one or more devices. Examples of a network interface device include, but are not limited to, a network interface card (e.g., a mobile network interface card, a LAN card), a modem, and any combination thereof. Examples of a network include, but are not limited to, a wide area network (e.g., the Internet, an enterprise network), a local area network (e.g., a network associated with an office, a building, a campus or other relatively small geographic space), a telephone network, a data network associated with a telephone/voice provider (e.g., a mobile communications provider data and/or voice network), a direct connection between two computing devices, and any combinations thereof. A network may employ a wired and/or a wireless mode of communication. In general, any network topology may be used. Information (e.g., data, software etc.) may be communicated to and/or from a computer and/or a computing device. Computing device 104 may include but is not limited to, for example, a computing device or cluster of computing devices in a first location and a second computing device or cluster of computing devices in a second location. Computing device 104 may include one or more computing devices dedicated to data storage, security, distribution of traffic for load balancing, and the like. Computing device 104 may distribute one or more computing tasks as described below across a plurality of computing devices of computing device, which may operate in parallel, in series, redundantly, or in any other manner used for distribution of tasks or memory between computing devices. Computing device 104 may be implemented, as a non-limiting example, using a "shared nothing" architecture.

With continued reference to FIG. 1, computing device 104 may be designed and/or configured to perform any method, method step, or sequence of method steps in any embodiment described in this disclosure, in any order and with any degree of repetition. For instance, computing device 104 may be configured to perform a single step or sequence repeatedly until a desired or commanded outcome is achieved; repetition of a step or a sequence of steps may be performed iteratively and/or recursively using outputs of previous repetitions as inputs to subsequent repetitions, aggregating inputs and/or outputs of repetitions to produce an aggregate result, reduction or decrement of one or more variables such as global variables, and/or division of a larger processing task into a set of iteratively addressed smaller processing tasks. Computing device 104 may perform any step or sequence of steps as described in this disclosure in parallel, such as simultaneously and/or substantially simultaneously performing a step two or more times using two or more parallel threads, processor cores, or the like; division of tasks between parallel threads and/or processes may be performed according to any protocol suitable for division of tasks between iterations. Persons skilled in the art, upon reviewing the entirety of this disclosure, will be aware of various ways in which steps, sequences of steps, processing tasks, and/or data may be subdivided, shared, or otherwise dealt with using iteration, recursion, and/or parallel processing.

Still referring to FIG. 1, system 100 may incorporate an engagement module 112. The engagement module 112 may comprise one or several subsystems designed to capture detailed user interaction data 108. In some embodiments, the engagement module 112 might include a touch-sensitive system such as, but not limited to, capacitive touch screens, resistive touch screens, infrared touch screeds, optical imaging touch screens, dispersive signal technology touch screens, acoustic wave touch screens, and the like. The engagement module 112 is configured to capture more nuanced user interaction data 108. "Nuanced" as used in this disclosure refers to the intricate, subtle, or minute details or variations in the user's interactions with the user interface. Nuanced can include, but is not limited to, the duration of touch events, the pressure applied during touch, the speed of swiping motions, the pattern of interaction over time, and the sequence of actions taken by the user. In some embodiments, capturing nuanced user interaction data 108 can involve recording the raw touch events and subsequent processing these events to extract meaningful features or patterns. These extracted features or patterns then provide a richer and more detailed representation of the user's interaction behavior, which can significantly improve the system's ability to ability to adapt the user interface according to the user's preferences, habits, and needs.

Still referring to FIG. 1, system 100 may also encompass a communication module 124. The communication module 124 may integrate one or several subsystems aimed at facilitating data transmission and reception. In some embodiment, the communication module 124 might include networking technologies such as, but not limited to, Wi-Fi®, Bluetooth®, Ethernet, cellular networks, satellite communications, optical communication technologies, and the like. Communication module 124 is specifically configured to receive a server feedback data 120. The server feedback data 120, in this context, can refer to information sent by a remote server in response to the user interaction data or any other data sent by the system 100. As used in this disclosure, "remote server" refers to a computer or a system of computers that is not in the physical proximity of system 100 but can communicate with it over a network. This data may include, but is not limited to, updates to the user interface, updates to the recovery program, predictive models, data validation, and system updates. In some embodiments, the reception of server feedback data 120 by communication module 124 may trigger a series of actions, such as updating the user interface 116, or recalibrating machine-learning model 144 based on the updated data. By receiving and processing server feedback data 120, communication module 124 facilitates the dynamic operation of the system 100, allowing it to adapt and evolve in response to the server-side updates and the ongoing user interactions.

Still referring to FIG. 1, engagement module 112 and communication module 124 are designed to transmit user interaction data 108 and server feedback data 120, respectively, to computing device 104. This transmission of data facilitates computing device's ability to generate a responsive and dynamic user interface 116, in turn, enhancing the overall user experience. In some embodiments, the engagement module 112 may transmit user interaction data 108 to the computing device 104 over a secure, high-speed date connection, which may utilize protocols such as but not limited to, USB, Ethernet, or wireless protocols like Wi-Fi® or Bluetooth®. This ensures a rapid and efficient data transfer, thereby minimizing any potential lag or delay in user interface response time. Additionally, training data 132 can be received by the computing device 104. In this disclosure, training data 132 refers to a set of data instances correlating user interaction data 108 and server feedback data 120. This correlation, encapsulated in the training data 132, enables the system to learn and predict user behaviors and preferences, thereby making the user interface more intuitive and personalized. The training data 132 may be used by the computing device 104 to train a machine-leaning model 144, allowing system 100 to improve its performance over time and adapt to changing user interaction patterns or updates from server feedback data 120. The use of training data 132 thus contributes to a more dynamic, efficient, and user-friendly system 100.

Still referring to FIG. 1, the system 100 employs computing device 104, computing device 104 is configured to display an event handler 164 corresponding to a data-reception event handler. An "event handler," as used in this disclosure, is a module, data structure, function, and/or routine that performs an action on remote device in response to a user interaction 108. For instance, and without limitation, an event handler may record data corresponding to user selections of previously populated fields such as drop-down lists and/or text auto-complete and/or default entries, data corresponding to user selections of checkboxes, radio buttons, or the like, potentially along with automatically entered data triggered by such selections, user entry of textual data using a keyboard, touchscreen, speech-to-text program, or the like. Event handler may generate prompts for further information, may compare data to validation rules such as requirements that the data in question be entered within certain numerical ranges, and/or may modify data and/or generate warnings to a user in response to such requirements. Event handlers may convert data into expected and/or desired formats, for instance such as date formats, currency entry formats, name formats, or the like. Event handler may transmit data from remote device to computing device 104. The determination process is a function of a captured user interaction data 148 and server feedback data 120. User interaction data 108 may also capture through the engagement module 112, records of a multitude of user behaviors and inputs, providing a comprehensive overview of user-system interactions. As described in this disclosure, a "user-system interaction" refers to the various ways in which a user interacts with the system, providing inputs and receiving outputs. These interactions encompass a wide array of activities, including but not limited to direct input actions, behavioral actions, and passive interactions. As a non-limiting example, direct input actions may include any direct commands issued by the user to the system through available interfaces. For example, using a keyboard, mouse, touchscreen, or voice command to instruct the system or navigate through its functions. Behavioral action not only directs inputs but may also include user interaction behaviors such as the speed and pattern of typing, the way they navigate through the user interface, or the time spent on different parts of the system. Passive interactions are indirect inputs the system records about the user's behavior, often without direct user input. For example, system may track which parts of the user interface the user's eyes are focused on using eye-tracking technology or infer the user's preferences and habits based on their interaction history. Overall, user-system interaction includes but is not limited to, user gestures, touch patterns, navigation choices, and time spent on different components of the user interface. Simultaneously, the server feedback data 120, collected through the communication module 124, provides valuable information about the system's state, its operational parameters, and potential adjustments or improvements as suggested by a remote server. For example, remote server provides data, guidance, or instructions based on its vast processing power and data pool. By combining the insights from both the user interaction data 108 and the server feedback data 120, computer device 104 is equipped to determine the current user interface state 128.

Still referring to FIG. 1, the system 100 may include a computing device 104 configured to predict an optimal user interface state 136 as a function of the user interaction data 108 and the server feedback data 120. The process of prediction involves the receipt of training data 132, where training data 132 correlates user interaction data 108 with corresponding optimal user interface state 136 in this disclosure. The computing device 104 is also designed to train a user interface generation 140 with machine-learning model 144 based on the received training data 132. Machine-learning model 144, through its training, gains the ability to analyze the user interaction data 108, interpret the server feedback data 120, and generate an optimal user interface state 136. This prediction utilizes complex algorithms and heuristics to determine which user interface state may best suit the user's needs, preferences, and current context.

With continued reference to FIG. 1, the system 100 may additionally include a configuration in which the computing device 104 generates user interaction data extraction templates as a function of the predicted optimal user interface state 136. The process of generation focuses on devising methods to efficiently and effectively capture relevant user interaction data 108, ensuring that the most pertinent data is being considered when determining optimal user interface state 136. In the context of this disclosure, "extraction templates" refer to predefined schemas or patterns used to identify and extract valuable data from the raw user interaction data 108. Extraction templates serve as guides that allow the system to understand and contextualize the user interaction data 108 by focusing on the most relevant aspects of the interaction, while disregarding extraneous data. This increases the efficiency and accuracy of the data processing system, ensuring that the best possible user interface state is being presented to the user. As a non-limiting example, extraction template in enhancing mental and physical performance may prioritize data related to the user's engagement with different mental exercises or physical routines within the application, the frequency and duration of these activities, and the user's progress over time. This data, when processed, may inform the system of the user's preferences, strengths, and areas for improvement, enabling the prediction of an optimal user interface state 136 that personalizes the layout and recommendations of the mental and physical performance module to the user's specific needs and goal.

Still referring to FIG. 1, the system 100 further demonstrates the functionality of the computer device 104 to generate an updated display data structure 152. This generation is a function of the predicted optimal user interface state 136, the captured user interaction data 148, and the current user interface state 128. The process harnesses these components to construct a user interface 116 that is optimally suited to the user's interaction patterns and the system predictive model. Moreover, the computer device 104 is equipped to manage constraint data. It accomplishes this through receiving constraint training data 132, which is then processed by the machine-learning model 144. This model, trained with both the constraint training data 132 and user interaction data 108, identifies a plurality of constraints that may affect the user-system interaction. These constraints could include, but are not limited to, user preferences, system capabilities, or certain parameters specified by the server feedback data 120. In the final step of this process, the effect of these identified constraints on the predicted optimal user interface state 136 is calculated. This calculation assesses how constraints might alter the functionality or layout of the optimal user interface 136. The outcome of this calculation is subsequently used to fine-tune the updated display data structure 152, ensuring that the presented user interface is both conductive to the user's needs a compatible with the constraints identified by the system 100.

Still referring to FIG. 1, an integral component of the system 100 is a governor module, not explicitly depicted but included within the functionality of the computing device 104. In this disclosure, "governor module" refers to a loss function, a mathematical measure designed to express the degree of deviation between the predicted optimal user interface state 136 and the actual user engagement reality. The process of generating the optimal user interface state 136 involves an objective of minimizing this loss function, which leads to a more accurate and effective interface prediction. Computer device 104 achieves this minimization by evaluating a broad solution set which comprises a plurality of potential user interface states. Each potential state in this set is assessed based on the average user engagement time. This time factor serves as a quantifiable measure of user-system interaction efficiency and user satisfaction. By considering the average user engagement time, the computing device 104 is equipped to determine the most efficient user interface state among the solution set. This state minimizes a loss function and thereby maximizes the accuracy of the predicted optimal user interface state 136. As described in this disclosure, a "loss function" refers to a mathematical method utilized to estimate the amount or degree of 'loss' or error in a predictive model, in this case, the user interface generation model. In the context of machine-learning and optimization, the loss function provides a measure of how well the algorithm or model is performing by comparing the predicted output to the actual output. The difference between these outputs is quantified by the loss function. In this disclosure, the loss function is used in the context of generating an optimal user interface state 136, where loss represents the difference between the predicted user interface state and the actual state preferred or most efficient for the user. The aim of the system is to minimize this loss, leading to more accurate and effective predictions of the optimal user interface state 136. For example, a system designed to enhance mental and physical performance through a dynamic and personalized user interface, this system may include modules for tracking various physiological and psychological parameters of the user, such as heart rate, mood, attention span, or physical exertion levels. These parameters may be used to predict the user's performance and to adjust the user interface in a way that is most conductive to enhancing their mental and physical performance. As a non-limiting example, a loss function may be the mean squared error (MSE). Here, the actual value is the true performance levels of the user, which can be measured through various means like self-reports, performance tests, or physiological measures. The predicted values are the performance levels predicted by the system based on the user interaction data and the server feedback data 120. The MSE loss function may calculate the square of the difference between the actual and predicted performance levels, and then average these squared differences over all the data points. Loss function penalizes large deviations between actual and predicted performance more severely due to the squaring operation, which would encourage the system to avoid large errors and thereby provide a more accurate prediction of the user's optimal interface state. Minimizing loss function means the system is becoming better at predicting user's performance level and adjusting the user interface to enhance their mental and physical performance. For example, if the system predicts that the user performs better mentally when they are in a calm state, the user interface might adjust to display more calming visuals or play soothing music when the user is feeling stressed.

Still referring to FIG. 1, computing device 104 may be configured to display the updated user interface, which is derived from the updated display data structure 152, to the user through an interactive graphical user interface of a remote computing device 160. This user interface display process incorporates the adjustments made based on the predicted optimal user interface state 136, the captured user interaction data 108, and the current user interface 128. The updates aim to further enhance the user's experience and engagement. As part of this dynamic and iterative process, the remote computing device 160 is configured to receive further user interaction data 108. This data may be generated from the user's subsequent interactions with the displayed user interface. The computing device 104 then utilizes this additional user interaction data to further update the display data structure 152, and consequently, the user interface 116. This iterative process aids in maintaining an optimal user interface that continually adapts to the user's needs and behaviors, thereby fostering an environment for enhanced mental and physical performance.

Still referring to FIG. 1, computer device 104 may be further configured to categorize the user interaction data 108 into various types of interactions. This categorization can enhance the understanding of user behavior, the nature of the interaction, and the context in which the interaction occurred, thereby improving the accuracy and effectiveness of the predicted optimal user interface state 136. As a non-limiting example, if the system is utilized as a part of a mental and physical performance enhancement model, interactions may include actions such as the user's responses to cognitive tasks, physical exercises, biofeedback, or wellness prompts. These responses may be in the form of selecting options, providing textual inputs, performing physical actions tracked by sensors, or any other forms of engagement tracked by the system. The categorized interaction data 108 then contributes to training the machine-learning model 144, facilitating the creating of a more personalized, effective, and user-centric interface.

Still referring to FIG. 1, computer device 104 may be further configured to optimize a section of a user interface 116 template from a multitude of interface template stored in a template network. This optimization can further refine the presentation of the user interface, focusing on its adaptability, responsiveness, and alignment with user preferences and needs. In this disclosure, a "template network" refers to database or a repository containing a wide array of pre-defined or dynamically generated user interface template. These template may vary in elements such as structure, visual design, interaction design, information architecture, and adaptive capabilities. The template network may also include metadata associated with each template, such as its effectiveness in different contexts, user feedback, or performance metrics. As a non-limiting example, in the context of a system enhancing mental and physical performance, the template network may contain interface template designed for various cognitive tasks or physical exercises. These template may be tailored for different levels of task complexity, user proficiency, user physical condition, or specific user goals. The template selected by computer device 104 may then be the one that best matches the user's current needs and capabilities, as determined from the user interaction data 108 and server feedback data 120.

Still referring to FIG. 1, remote computing device 160 may be configured to communicate with a user interface data network. This network may provide additional data or context that could inform the adaptation of the user interface 116. The server feedback data 120, communicated via the data network, may be leveraged to update the user interface adaptation machine-learning model 144, enabling it to better predict and respond to user interaction data 108. In some embodiments, remote computing device 160—may incorporate fuzzy logic techniques. In the context of this disclosure, a "fuzzy logic technique" refers to a computing approach that allows for degrees of truth or probability, rather than absolute true or false (1 or 0) binary logic. Fuzzy logic techniques model the ambiguity and nuances of human decision-making processes, where answers may range within a spectrum of possibilities instead of being confined to two polar opposites. In relation to a system designed for enhancing mental and physical performance, fuzzy logic techniques may be used in interpreting user's behavior and responses. For example, a fitness tracking application may incorporate fuzzy logic to analyze user's heart rate data. Instead of setting rigid thresholds to classify the user's workout intensity as 'low', 'medium', or 'high', fuzzy logic could determine the intensity on a continuum scale based on the heart rate data, taking into account other factors like the user's age, fitness level, and personal preferences. This would result in a more accurate and personalized representation of the user's workout intensity, thus enhancing the system's ability to offer tailored advice and feedback. This configuration may allow for the measurement of the coherence or consistency of the user's interactions with the optimal user interface state 136. This coherence assessment could serve as an additional factor influencing the generation of the updated display data structure 152. In such a setup, the computing device 104 may employ a fuzzy set machine-learning model to process the user interaction data 108. This model may categorize the user interaction data into fuzzy sets, essentially grouping them into categories not strictly bounded, but rather characterized by degrees of membership. This may allow for smoother transitions between different user interface states during the update of the display data structure 152, contributing to a more fluid and adaptive user interface 116. This application of fuzzy set theory may enhance the adaptability and responsiveness of the user interface 116, promoting an overall more seamless and user-tailored interactive experience.

Continuing to refer to FIG. 1, in another embodiment, the machine-learning model 144 may include one or more fuzzy sets. As used in this disclosure, a "fuzzy set" refers to a type of set wherein elements have degree of membership. This contrasts with conventional sets where elements either belong or do not belong. For example, have a membership value of 1 or 0 respectively. Fuzzy sets allow for more nuanced classification, as elements can have a degree of membership anywhere between 0 and 1. In another example, in the context of a system aimed at enhancing metal and physical performance, user interaction data 108 might include parameters like reaction time, frequency of interaction, sequence of interactions, and duration of interactions. Each of these parameters could be divided into fuzzy sets such as low, medium, and high. A particular user's reaction time, for instance, might not distinctly fall into either of these reaction time, for instance, might not distinctly fall into either of these categories, but instead have a degree of membership in both medium and high. This allows the system to better capture and interpret the variability and uncertainty inherent in user interactions, thereby contributing to a more accurate and dynamic generation of the optimal user interface state 136.

Still referring to FIG. 1, it may be noted that fuzzy sets not only embody values for linguistic variables but also inform the output of the system in terms of these variables. In this embodiment, "output linguistic variables" refer to the classifications of the predicted optimal user interface state 136, which may include terms such as "simple," "complex," "minimal," or "detailed." The categorization into these sets forms an integral part of the system's adaptive response. Each linguistic variable, may be an input or output variable, may be associated with a score on a numerical range. For example, the level of "user engagement" may be quantified using a numerical score ranging from 0 to 100, with '0' indicating absolute non-engagement and '100' indicating maximal engagement. This score can be calculated using a machine-learning method, which may be trained using any process described in this disclosure, which processes the collected user interaction data 108. This user interaction data may include information such as the duration of the user's engagement with the user interface, the frequency and type of user interface components interacted with, the sequence of user actions, and user input responses to specific prompts or tasks. The data may originate from various sources such as direct user inputs, recorded user activity, past iterations of the user-interface interaction process, and server feedback data; users inputting data, such as users configuring apparatus, may label each such dataset with, for instance, a rating indicating a score for the degree of activity. Such correlated data examples may be used as training examples to train a machine-learning model to input user activity and output a score representing a level of user activity. Continuing in FIG. 1, the score may be matched to one or more fuzzy sets within the numerical range corresponding to each linguistic variable value. In this embodiment, "linguistic variables" refer to variables that can be expressed in a natural language, such as "high," "medium," "low," "frequent," "rare," "quick," "slow," and so on. These linguistic terms serve to categorize numerical data in a more interpretative and human understanding way. As an illustrative example within the system for enhancing mental and physical performance, one linguistic variable may be user engagement. This may have fuzzy sets like "low engagement," "moderate engagement," and "high engagement." Another linguistic variable may be mapped on these linguistic terms based on the fuzzy sets defined. Following this, the score is matched to one or more fuzzy sets within the numerical range corresponding to each linguistic variable value. For example, user engagement score of 45 may have a high degree of membership in the "low engagement" fuzzy set and a moderate degree of membership in the "medium engagement" fuzzy set. This way, the system allows for an overlapping, non-binary classification. The rules for matching these input sets to an output linguistic variable may be defined based on fuzzy logic principles. For example, a rule might state that if the user engagement is "low" and interaction time is "slow," then the optimal user interface state may be "simple." Similarly, if the user engagement is "high" and interaction time is "quick," the system may predict a "complex" optimal user interface state. For example, "interaction time" variable may encompass a variety of data, including the total duration of a user's session with the user interface, the time spent on each individual task or interface component, and the latency between user actions. This data might come from several sources such as system timestamp for user actions, recorded intervals between user responses, and even predictive models estimating the user's future interaction times based on past behavior. Users inputting data, such as users configuring apparatus, may label each such dataset with, for instance, a rating indicating a score representing interaction time, where a higher score indicates a higher interaction time; such labeled data may be used to train a machine-learning model mapping recorded interactions to interaction time scores. Alternatively or additionally, interaction time may be recorded as an absolute number of seconds, minutes and/or hours, and linguistic variable values may be defined on a continuum of such times. Fuzzy sets may have any form described below; parameters including centroids, coefficients, and/or biases may be determined by user input correlating scores, times, or the like to user identifications or labels indicating subjective determinations by users of linguistic values to be assigned to such scores and/or times. Such user inputs, correlated to such scores and/or values, may be used by machine-learning processes to train and/or tune centroids, coefficients, and/or biases; user inputs may be "crowd-sourced" by soliciting and receiving a plurality of user inputs labeling times and/or scores with one or more labels of linguistic variable values. These linguistic variables and their corresponding fuzzy sets allow the machine learning model 144 to interpret and adapt to the nuanced, variable, and sometimes ambiguous nature of user interactions, resulting in a more responsive and customized user interface.

Still referring to FIG. 1, fuzzy inferencing rules often constitute the core of the fuzzy logic-based decision-making process within our machine-learning 144. They provide structured guidelines to help the system interpret and respond to various combinations of linguistic variables and their fuzzy set values. For example, fuzzy inferencing rules may include, if a user engagement is high and speed of navigation is fast, then the optimal user interface state is complex. This rule implies that when a user is highly engaged and navigates swiftly, the system may consider presenting a more complex interface, perhaps with more options, functions, or layers of interactivity. Another rule may state, if a user engagement is low and speed of navigation is slow, then the optimal user interface state is simple. This rule suggests that a less engaged user, who also navigates slowly, might benefit from a more straightforward and streamlined interface. In more advanced scenarios, for example, there may be multiple rules interacting, providing more nuanced responses to the various state of user interaction data. The weighted combination of these rules, through defuzzification, helps in predicting the optimal user interface state 136. By incorporating such fuzzy inferencing rules, the system effectively navigates the complexities of user interactions and preferencing, resulting in a more adaptive and personalized user interface.

Continuing to refer to FIG. 1, the optimal user interface state 136 may comprise interactive elements. As used in this disclosure, "interactive elements" refer to components or features of the user interface 116 that allow and promote user interaction. These elements could range from traditional forms of engagement such as buttons, text fields, and sliders to more complex and dynamic elements such as interactive charts, animation effects, and gesture-based controls. The interactive elements present in the optimal user interface state 136 may be determined based on the user interaction data 108, server feedback data 120, and the machine learning model 144. The interactive elements are designed to promote a higher degree of engagement from the user and may be selected and positioned optimally based on the machine learning model's analysis. For example, in the context of a system enhancing mental and physical performance, the interactive elements could include components such as progress bars indicating exercise completion, interactive charts displaying health data over time, or personalized reminders and prompts encouraging regular workout schedules. By dynamically adjusting these interactive elements in the user interface 116 according to the user's interaction data 108, the system can potentially increase user engagement and enhance user performance over time.

Continuing to refer to FIG. 1, the optimal user interface state 136 may incorporate a navigation strategy to enhance user engagement. As used in this disclosure, a "navigation strategy" refers to the layout, structure, and interactive pathways of the user interface 116 that guide user behavior and facilitate smooth and intuitive interaction with the system. The navigation strategy within the optimal user interface state 136 is determined as a function of user interaction data 108, server feedback data 120, and the predictions of the machine learning model 144. The purpose of the navigation strategy is to promote seamless interaction and maintain or increase user engagement with the system. In the context of a system designed to enhance mental and physical performance, the navigation strategy could be structured to lead users through workout routines, educational content, or performance tracking in an intuitive and user-friendly manner. For instance, the user interface 116 might incorporate a dashboard-style layout allowing the user to easily access different features of the application. Sequentially ordered menus or interactive guidance tools could be included to direct users through a set of tasks or actions, providing them with a clear path to achieve their goals. By employing a navigation strategy optimized based on user interaction data, the system may enhance user engagement, potentially resulting in improved mental and physical performance over time.

Continuing to reference FIG. 1, the system 100 may be additionally designed to facilitate the selection of an optimal user interface state by generating a user interface adjustment instruction set. This instruction set may prioritize certain interface elements over others, as guided by the optimized objective function. The instruction set may contain a sequence of directives, specifying how the user interface 116 may be adjusted or manipulated to reach the predicted optimal user interface state 136. The adjustments may involve reordering, repositioning, or reshaping of interface elements, and may also include changes in the functionality or interactivity of certain elements based on the user interaction data 108. The prioritization of a first interface element, or any given interface element, may be determined as a function of the optimized objective function. This suggests that the importance, relevance, or priority of an interface element can be ascertained based on its contribution to achieving the objective function's goals. For example, in the context of enhancing mental and physical performance, a certain element encouraging physical activity or focus could be prioritized if it leads to higher user engagement or task completion rates. In this way, the system 100 employs the objective function to shape the most effective and efficient user interface, adapting to user behaviors and preferences for optimal engagement and satisfaction.

Still referring to FIG. 1, the system 100 may also encompass a user interaction database, designed to store and categorize a plurality of user interaction data 108 collected from a multitude of users. The database is constructed in such a way that it not only holds the data but also facilitates the arrangement and categorization of the information using a bespoke classification system. This classification system organizes the user interaction data 108 based on specific attributes or parameters. These might include types of interactions, user profiles, time and duration of interactions, specific actions taken, or any other relevant factor. The classification system can be optimized based on the requirements of the machine learning model 144 or the specific needs of the system in understanding and utilizing the user interaction data. For example, in a system intended to enhance mental and physical performance, the classification system could segregate user interactions based on different workout regimens followed, types of educational content accessed, performance metrics tracked, etc. This would allow the system to identify patterns and trends across the data, thereby enhancing the precision of the machine learning model 144 and ultimately optimizing the user interface 116 to maximize user engagement and performance outcomes.

Still referring to FIG. 1, the system 100 may further be configured to generate an output that scores potential user interface states based on at least one user satisfaction criterion. This process may, for example, involve scoring in relation to the disparity between expected interaction time and the expected task completion time. The expected interaction time could refer to the estimated amount of time a user is projected to engage with certain elements or sections of the user interface 116. The expected task completion time, on the other hand, could denote the time predicted for a user to complete a specific task or action within the user interface 116. The system 100 may calculate these times based on a myriad of factors, such as previous user interaction data 108, user profiles, complexity of tasks, and other relevant attributes. The scoring process would then assess the difference between these two times, providing a numerical representation of the user interface state's effectiveness and efficiency. This scoring process may aid in fine-tuning the user interface 116, leading to enhanced user satisfaction and increased productivity, especially in scenarios aiming to enhance mental and physical performance where time-efficiency is crucial.

Figure 2:
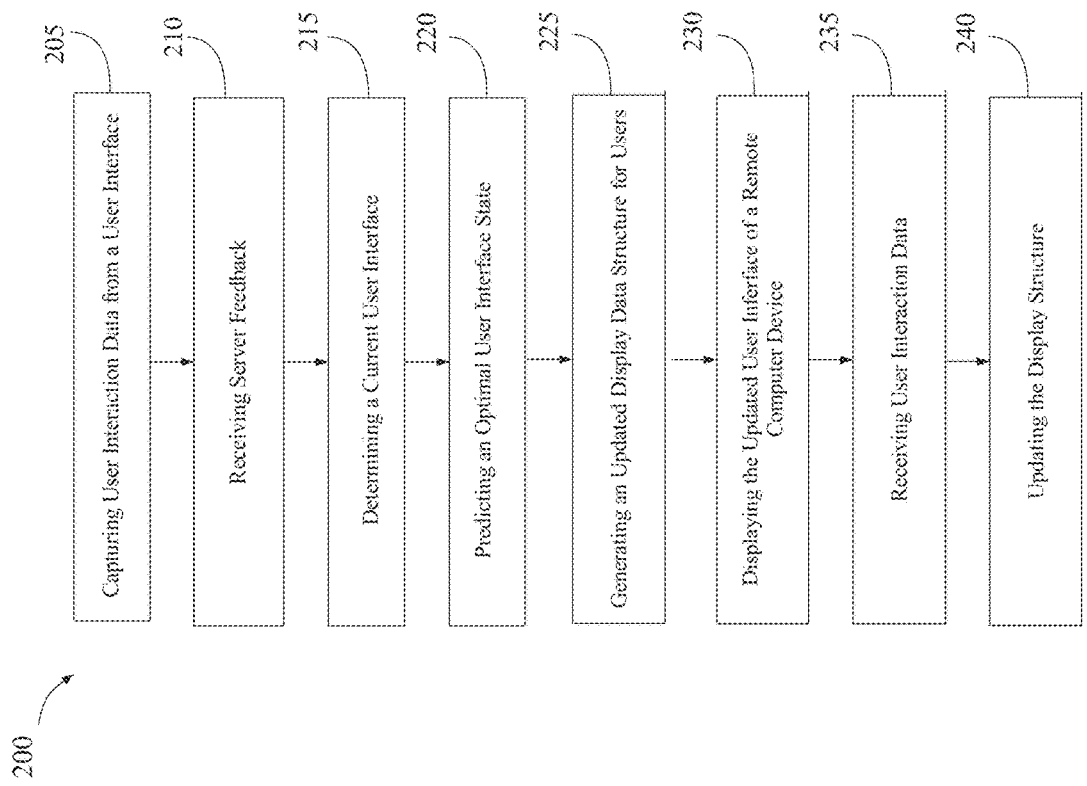
FIG. 2 is a flowchart of a method of dynamic user interface generation.

Referring now to FIG. 2, a flowchart for method 200 of dynamic user interface generation. Starting with step 205, method 200 encompasses capturing user interaction data from a user interface via an engagement module. This data gathering phase forms the bedrock of the process, providing vital information on how users interact with the interface, including their preferences, habits, and responses to different interface states. In certain embodiments, the engagement module may employ a variety of systems or sensors to collect this data. These might encompass touch-sensitive systems, eye-tracking systems, or even motion sensors, each capable of capturing different facets of user interaction data. The collected data may include details such as duration of interaction with certain interface elements, sequence of actions, speed or fluidity of navigation, frequency of specific action patterns, and the like. Capturing user interaction data may be as described in FIG. 1.

Still referring to FIG. 2, at step 210, the method 200 proceeds with receiving server feedback data. This step is vital in that it allows for a constant stream of information flow, necessary for adapting the user interface to the evolving needs and patterns of the user. Server feedback data is collected through the communication module, providing a wealth of insights about the user interaction trends and interface performance metrics. In certain embodiments, this data may stem from diverse sources including, but not limited to, aggregated user data, system performance statistics, and user engagement metrics. This process of receiving server feedback data aligns with the description provided in FIG. 1.

Still referring to FIG. 2, at step 215, the method 200 proceeds with determining a current user interface state, a process that is shaped by both the user interaction data and the server feedback data. This step ensures the system is cognizant of the interface's current state, including all active elements and their configurations. By factoring in user interaction data and server feedback data, the system effectively accounts for the user's past behaviors and preferences as well as the overarching trends and metrics derived from the server. This calculated awareness of the current user interface state helps inform subsequent steps in the method. This process of determining the current user interface state has been elaborated in FIG. 1.

Still referring to FIG. 2, at step 220, method 200 progresses with predicting an optimal user interface state. This step operates as a function of the user interaction data and the current user interface state and comprises a multi-staged process. Firstly, the system receives training data that correlates the user interaction data and server feedback data with various states of the user interfaces. This training data provides an extensive and insightful dataset which the system can utilize to identify patterns, correlations, and trends. Subsequently, this training data is fed into a user interface adaptation machine learning process. The machine learning model uses the data to train itself, improving its ability to predict the optimal user interface state with more accuracy over time. Lastly, the system predicts the optimal user interface state. The prediction process uses the current user interaction data and server feedback data, running it through the trained machine learning model. This model, now equipped with comprehensive understanding of correlations between user behaviors, server feedback, and successful interface states, can output an informed prediction of the most suitable interface state. The predictive process for the optimal user interface state is further elaborated in FIG. 1.

Still referring to FIG. 2, at step 225, method 200 progresses with generating an updated display data structure for the user. This generation step leverages the predicted optimal user interface state, the captured user interaction data, and the current user interface state. The updated display data structure forms the blueprint for the user interface, detailing the arrangement and behavior of its elements in response to user interactions. This data structure is tailored for each user, shaped by the uniquely identified optimal user interface state and informed by the user's interaction patterns and preferences. It represents an important step towards personalizing the user's interaction experience, making the user interface more intuitive and user-friendly. The dynamic nature of this process ensures continuous improvement, with the system adapting to changes in user interaction habits and preferences over time. This procedure of generating an updated display data structure is further explained in FIG. 1.

Still referring to FIG. 2, at step 230, method 200 continues by displaying the updated user interface to the user via an interactive graphical user interface on a remote computing device. In this crucial stage, the refined user interface, born out of the computed optimal state, is brought forth to the user, providing a tailored, dynamic experience that aligns with the user's interaction behavior and preferences. This not only elevates user engagement but also enhances overall system efficiency. The complexities and specifics of this operation, including the technology and algorithms leveraged to effectively implement the updated interface, are further illustrated in the context of FIG. 1.

Still referring to FIG. 2, at step 235, method 200 continues with the receiving through the remote computing device. This step signifies a continuous feedback loop in the process, allowing for constant improvement and evolution of the user interface. The system is thus able to incorporate new user responses and adapt the interface dynamically to reflect ongoing changes in user interaction patterns. As such, the system can keep up with shifts in user behavior, requirements, or preferences, reinforcing the objective of maintaining optimal user engagement. The nature and collection of further user interaction data aligns with the description provided in the context of FIG. 1.

Continuing with FIG. 2, at step 240, method 200 advances by updating the display data structure and subsequently, the user interface, based on the newly received user interaction data. This real-time iterative process plays a crucial role in maintaining a dynamic, responsive, and personalized user interface. Updates to the display data structure can range from minor tweaks to major overhauls, all determined by the scope and nature of changes in the user interaction data. These updates serve to further enhance the user's experience by making the user interface more adaptive and intuitive. This progression and adaptation mechanism resonates with the principles discussed in relation to FIG. 1.

Figure 3:
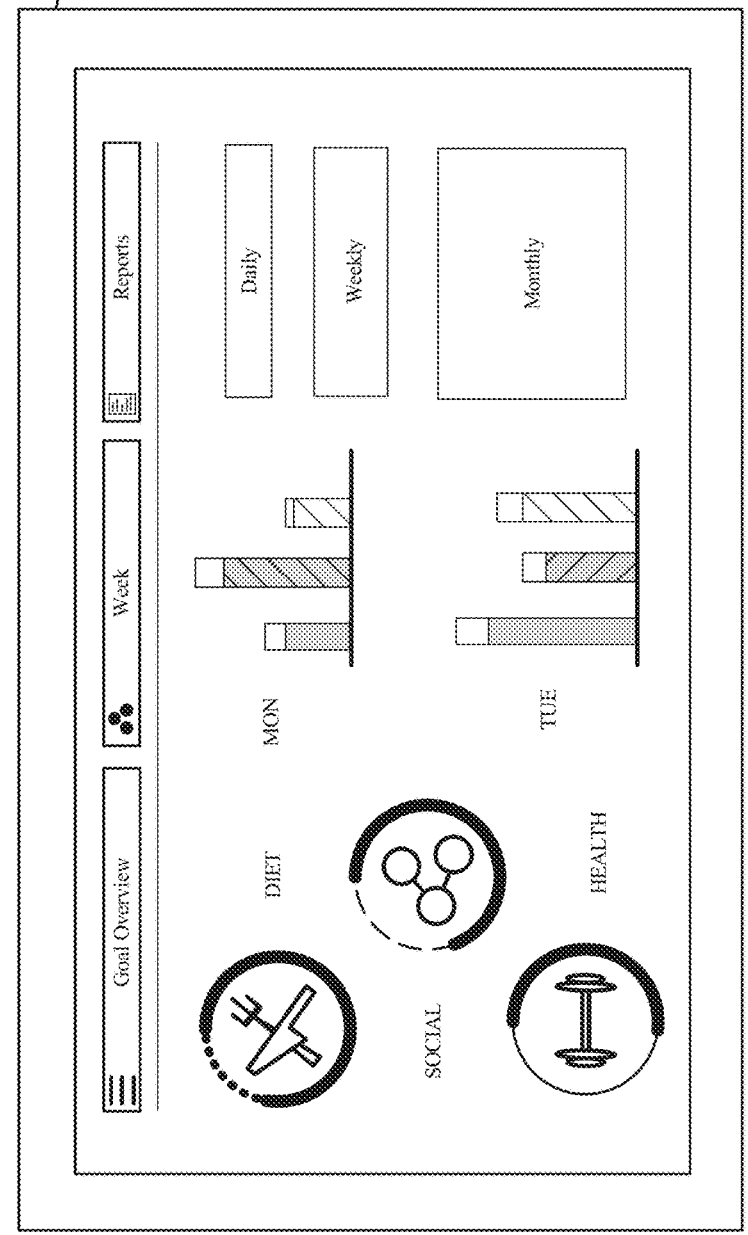
FIG. 3 is an illustrative embodiment of a user interface.
Figure 3:
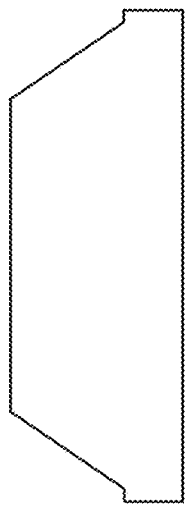

Referring now to FIG. 3, an illustrative embodiment of a user interface 300 is illustrated. User interface 300 may be displayed on a computing device, such as display device 304. In a given embodiment, user interface 300 may showcase a goal overview, which provides a detailed representation of the user's targets and their current progress. The user interface 300 may contain interactive elements equipped with associated event handlers. These interactive elements allow the user to interact with the initially displayed data by selecting various parameters or options. Each interactive element allows the user to interact with the initially displayed data by selecting various parameters or options. Each interaction actuates an event handler which is designed to update the display or process the user's input dynamically. User interface 300 may also contain a weekly progress bar that illustrates the user's achieved progress against their set goals on a weekly basis. This visual display serves to provide the user with a clear, concise understanding of their performance versus their predetermined objectives. Further, the interface may also include detailed reports on a daily, weekly, or monthly basis. These reports, visually presented in an easily comprehensible format, offer user an in-depth understanding of their progression, enabling them to adapt their actions and strategies accordingly for enhanced performance. This intuitive and interactive user interface design offers a tailored user experience, contributing to an efficient and engaging interactive environment.

Figure 4:
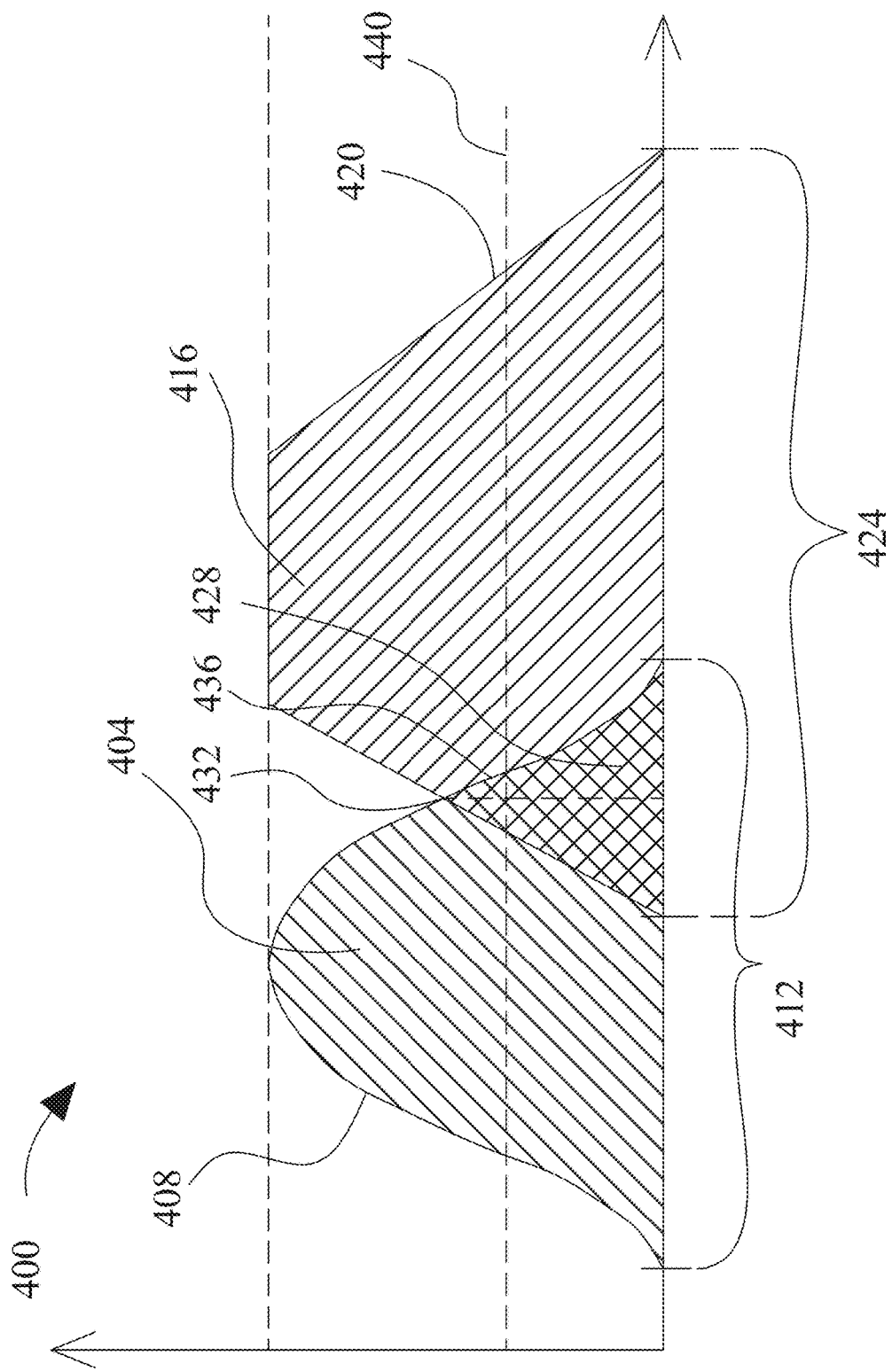
FIG. 4 is a graph illustrating an exemplary relationship between fuzzy sets.

Referring now to FIG. 4, an exemplary embodiment of fuzzy set comparison 400 is illustrated. A first fuzzy set 404 may be represented, without limitation, according to a first membership function 408 representing a probability that an input falling on a first range of values 412 is a member of the first fuzzy set 404, where the first membership function 408 has values on a range of probabilities such as without limitation the interval [0,1], and an area beneath the first membership function 408 may represent a set of values within first fuzzy set 404. Although first range of values 412 is illustrated for clarity in this exemplary depiction as a range on a single number line or axis, first range of values 412 may be defined on two or more dimensions, representing, for instance, a Cartesian product between a plurality of ranges, curves, axes, spaces, dimensions, or the like. First membership function 408 may include any suitable function mapping first range 412 to a probability interval, including without limitation a triangular function defined by two linear elements such as line segments or planes that intersect at or below the top of the probability interval. As a non-limiting example, triangular membership function may be defined as:

$$y(x, a, b, c) = \begin{cases} 0, \text{ for } x > c \text{ and } x < a \\ \frac{x-a}{b-a}, \text{ for } a \leq x < b \\ \frac{c-x}{c-b}, \text{ if } b < x \leq c \end{cases}$$

a trapezoidal membership function may be defined as:

$$y(x, a, b, c, d) = \max\left(\min\left(\frac{x-a}{b-a}, 1, \frac{d-x}{d-c}\right), 0\right)$$

a sigmoidal function may be defined as:

$$y(x, a, c) = \frac{1}{1 - e^{-a(x-c)}}$$

a Gaussian membership function may be defined as:

$$y(x, c, \sigma) = e^{-\frac{1}{2}\left(\frac{x-c}{\sigma}\right)^2}$$

and a bell membership function may be defined as:

$$y(x, a, b, c,) = \left[1 + \left|\frac{x-c}{a}\right|^{2b}\right]^{-1}$$

Persons skilled in the art, upon reviewing the entirety of this disclosure, will be aware of various alternative or additional membership functions that may be used consistently with this disclosure.

Still referring to FIG. 4, first fuzzy set 404 may represent any value or combination of values as described above, including output from one or more machine-learning models and biofeedback signals from sensor, a predetermined class, such as without limitation a user state (e.g., attentive, inattentive, and the like). A second fuzzy set 416, which may represent any value which may be represented by first fuzzy set 404, may be defined by a second membership function 420 on a second range 424; second range 424 may be identical and/or overlap with first range 412 and/or may be combined with first range via Cartesian product or the like to generate a mapping permitting evaluation overlap of first fuzzy set 404 and second fuzzy set 416. Where first fuzzy set 404 and second fuzzy set 416 have a region 428 that overlaps, first membership function 408 and second membership function 420 may intersect at a point 432 representing a probability, as defined on probability interval, of a match between first fuzzy set 404 and second fuzzy set 416. Alternatively, or additionally, a single value of first and/or second fuzzy set may be located at a locus 436 on first range 412 and/or second range 424, where a probability of membership may be taken by evaluation of first membership function 408 and/or second membership function 420 at that range point. A probability at 428 and/or 432 may be compared to a threshold 440 to determine whether a positive match is indicated. Threshold 440 may, in a non-limiting example, represent a degree of match between first fuzzy set 404 and second fuzzy set 416, and/or single values therein with each other or with either set, which is sufficient for purposes of the matching process; for instance, threshold may indicate a sufficient degree of overlap between an output from one or more machine-learning models and/or a biofeedback signal and a predetermined class, such as without limitation a user state, for combination to occur as described above. Alternatively, or additionally, each threshold may be tuned by a machine-learning and/or statistical process, for instance and without limitation as described in further detail below.

Further referring to FIG. 4, in an embodiment, a degree of match between fuzzy sets may be used to classify user interaction data with a user interface state. For instance, if a set of user interaction data has a fuzzy set matching a user state fuzzy set by having a degree of overlap exceeding a threshold, computing device 104 may classify the user interaction data as belonging to that user interface state. Where multiple fuzzy matches are performed, degrees of match for each respective fuzzy set may be computed and aggregated through, for instance, addition, averaging, or the like, to determine an overall degree of match.

Still referring to FIG. 4, in an embodiment, a biofeedback signal may be compared to multiple user state fuzzy sets. For instance, biofeedback signal may be represented by a fuzzy set that is compared to each of the multiple user state fuzzy sets; and a degree of overlap exceeding a threshold between the biofeedback signal fuzzy set and any of the multiple user state fuzzy sets may cause computing device 104 to classify the biofeedback signal as belonging to a user state. For instance, in one embodiment there may be two user state fuzzy sets, representing respectively an attentive state and an inattentive state. Attentive state may have an attentive state fuzzy set; inattentive state may have an inattentive state fuzzy set; and biofeedback signal may have a biofeedback fuzzy set. Computing device 104, for example, may compare a biofeedback fuzzy set with each of attentive state fuzzy set and inattentive state fuzzy set, as described above, and classify a biofeedback signal to either, both, or neither of attentive state nor inattentive state. Machine-learning methods as described throughout may, in a non-limiting example, generate coefficients used in fuzzy set equations as described above, such as without limitation x, c, and σ of a Gaussian set as described above, as outputs of machine-learning methods. Likewise, biofeedback signal may be used indirectly to determine a fuzzy set, as biofeedback fuzzy set may be derived from outputs of one or more machine-learning models that take the biofeedback signal directly or indirectly as inputs.

Figure 5:
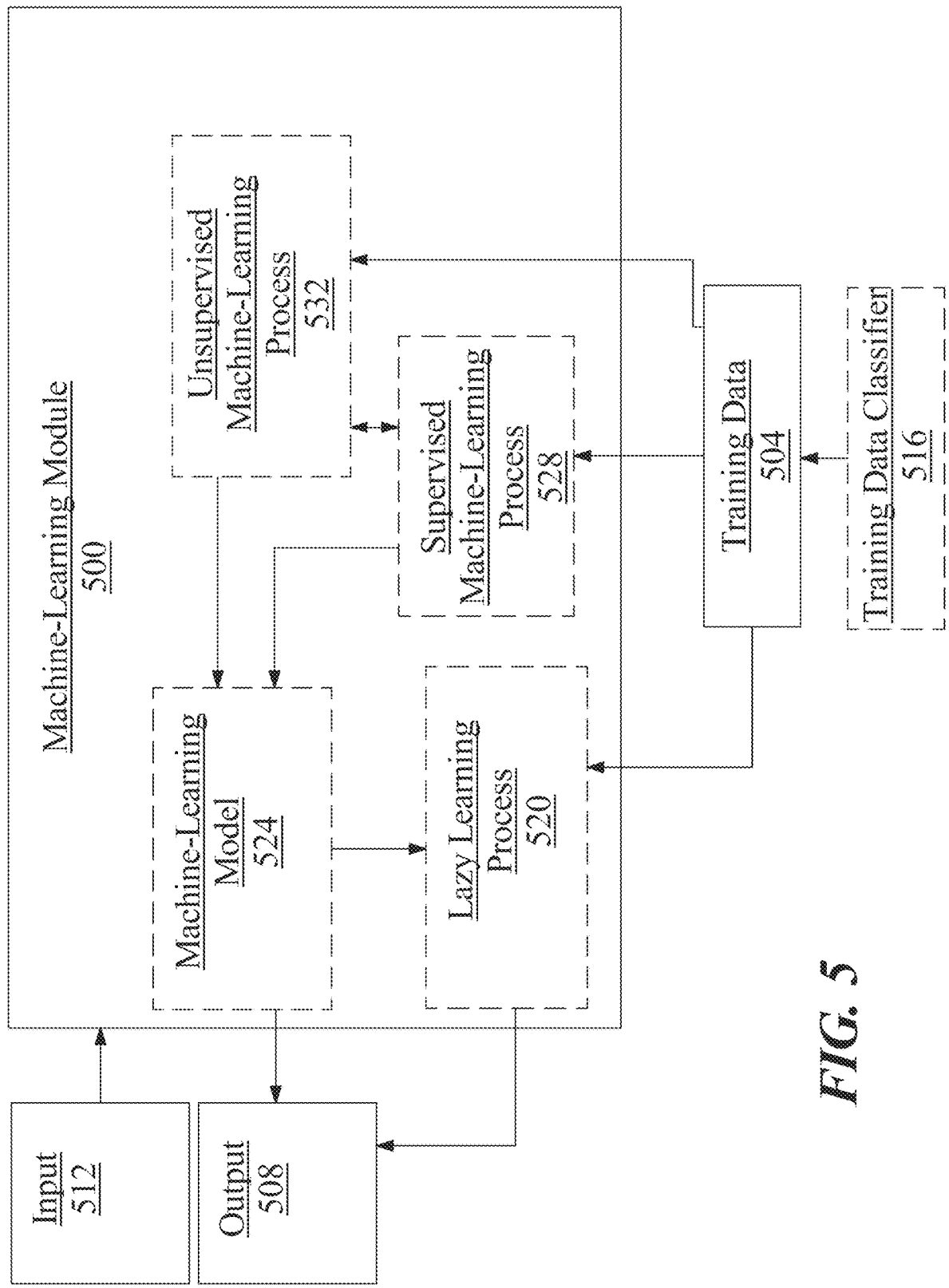
FIG. 5 is a block diagram of an exemplary embodiment of a machine learning model.

Referring now to FIG. 5, an exemplary embodiment of a machine-learning module 500 that may perform one or more machine-learning processes as described in this disclosure is illustrated. Machine-learning module may perform determinations, classification, and/or analysis steps, methods, processes, or the like as described in this disclosure using machine learning processes. A "machine learning process," as used in this disclosure, is a process that automatedly uses training data 504 to generate an algorithm instantiated in hardware or software logic, data structures, and/or functions that will be performed by a computing device/module to produce outputs 508 given data provided as inputs 512; this is in contrast to a non-machine learning software program where the commands to be executed are determined in advance by a user and written in a programming language.

Still referring to FIG. 5, "training data," as used herein, is data containing correlations that a machine-learning process may use to model relationships between two or more categories of data elements. For instance, and without limitation, training data 504 may include a plurality of data entries, also known as "training examples," each entry representing a set of data elements that were recorded, received, and/or generated together; data elements may be correlated by shared existence in a given data entry, by proximity in a given data entry, or the like. Multiple data entries in training data 504 may evince one or more trends in correlations between categories of data elements; for instance, and without limitation, a higher value of a first data element belonging to a first category of data element may tend to correlate to a higher value of a second data element belonging to a second category of data element, indicating a possible proportional or other mathematical relationship linking values belonging to the two categories. Multiple categories of data elements may be related in training data 504 according to various correlations; correlations may indicate causative and/or predictive links between categories of data elements, which may be modeled as relationships such as mathematical relationships by machine-learning processes as described in further detail below. Training data 504 may be formatted and/or organized by categories of data elements, for instance by associating data elements with one or more descriptors corresponding to categories of data elements. As a non-limiting example, training data 504 may include data entered in standardized forms by persons or processes, such that entry of a given data element in a given field in a form may be mapped to one or more descriptors of categories. Elements in training data 504 may be linked to descriptors of categories by tags, tokens, or other data elements; for instance, and without limitation, training data 504 may be provided in fixed-length formats, formats linking positions of data to categories such as comma-separated value (CSV) formats and/or self-describing formats such as extensible markup language (XML), JavaScript Object Notation (JSON), or the like, enabling processes or devices to detect categories of data.

Alternatively or additionally, and continuing to refer to FIG. 5, training data 504 may include one or more elements that are not categorized; that is, training data 504 may not be formatted or contain descriptors for some elements of data. Machine-learning algorithms and/or other processes may sort training data 504 according to one or more categorizations using, for instance, natural language processing algorithms, tokenization, detection of correlated values in raw data and the like; categories may be generated using correlation and/or other processing algorithms. As a non-limiting example, in a corpus of text, phrases making up a number "n" of compound words, such as nouns modified by other nouns, may be identified according to a statistically significant prevalence of n-grams containing such words in a particular order; such an n-gram may be categorized as an element of language such as a "word" to be tracked similarly to single words, generating a new category as a result of statistical analysis. Similarly, in a data entry including some textual data, a person's name may be identified by reference to a list, dictionary, or other compendium of terms, permitting ad-hoc categorization by machine-learning algorithms, and/or automated association of data in the data entry with descriptors or into a given format. The ability to categorize data entries automatedly may enable the same training data 504 to be made applicable for two or more distinct machine-learning algorithms as described in further detail below. Training data 504 used by machine-learning module 500 may correlate any input data as described in this disclosure to any output data as described in this disclosure. As a non-limiting illustrative example, in the context of a system enhancing mental and physical performance, the input data may include user interaction data and server feedback data. The output data, on the other hand, can be the optimal user interface state. The template network may contain interface templates designed for various cognitive tasks or physical exercises. These templates may be tailored for different levels of task complexity, user proficiency, user physical condition, or specific user goals. The template selected by computer device 104 may then be the one that best matches the user's current needs and capabilities, as determined from the user interaction data 108 and server feedback data 120.

Further referring to FIG. 5, training data may be filtered, sorted, and/or selected using one or more supervised and/or unsupervised machine-learning processes and/or models as described in further detail below; such models may include without limitation a training data classifier 516. Training data classifier 516 may include a "classifier," which as used in this disclosure is a machine-learning model as defined below, such as a data structure representing and/or using a mathematical model, neural net, or program generated by a machine learning algorithm known as a "classification algorithm," as described in further detail below, that sorts inputs into categories or bins of data, outputting the categories or bins of data and/or labels associated therewith. A classifier may be configured to output at least a datum that labels or otherwise identifies a set of data that are clustered together, found to be close under a distance metric as described below, or the like. A distance metric may include any norm, such as, without limitation, a Pythagorean norm. Machine-learning module 500 may generate a classifier using a classification algorithm, defined as a process whereby a computing device and/or any module and/or component operating thereon derives a classifier from training data 504. Classification may be performed using, without limitation, linear classifiers such as without limitation logistic regression and/or naive Bayes classifiers, nearest neighbor classifiers such as k-nearest neighbors classifiers, support vector machines, least squares support vector machines, fisher's linear discriminant, quadratic classifiers, decision trees, boosted trees, random forest classifiers, learning vector quantization, and/or neural network-based classifiers. As a non-limiting example, training data classifier 516 may classify elements of training data based on user interaction patterns and server feedback data. These may be used to distinguish different cohorts of users such as beginners, intermediate users, and advanced users, each of whom might interact with the user interface differently. For example, beginners might have more erratic navigation patterns and slower interaction times compared to advanced users who might exhibit more consistent navigation patterns and faster interaction times. This classification may be instrumental in optimizing the user interface state, wherein the system can tailor the interface design to accommodate the proficiency level of the user, leading to an enhanced user experience. Furthermore, the application of such subpopulation-specific classification to the training data can improve the efficiency and accuracy of the machine-learning algorithm. By learning from data more specific to a user's interaction level, the algorithm can generate more relevant and precise predictions about the optimal user interface state, leading to a more personalized and effective interface design.

With further reference to FIG. 5, training examples for use as training data may be selected from a population of potential examples according to cohorts relevant to an analytical problem to be solved, a classification task, or the like. Alternatively or additionally, training data may be selected to span a set of likely circumstances or inputs for a machine-learning model and/or process to encounter when deployed. For instance, and without limitation, for each category of input data to a machine-learning process or model that may exist in a range of values in a population of phenomena such as images, user data, process data, physical data, or the like, a computing device, processor, and/or machine-learning model may select training examples representing each possible value on such a range and/or a representative sample of values on such a range. Selection of a representative sample may include selection of training examples in proportions matching a statistically determined and/or predicted distribution of such values according to relative frequency, such that, for instance, values encountered more frequently in a population of data so analyzed are represented by more training examples than values that are encountered less frequently. Alternatively or additionally, a set of training examples may be compared to a collection of representative values in a database and/or presented to a user, so that a process can detect, automatically or via user input, one or more values that are not included in the set of training examples. Computing device, processor, and/or module may automatically generate a missing training example; this may be done by receiving and/or retrieving a missing input and/or output value and correlating the missing input and/or output value with a corresponding output and/or input value collocated in a data record with the retrieved value, provided by a user and/or other device, or the like.

Still referring to FIG. 5, computer, processor, and/or module may be configured to sanitize training data. "Sanitizing" training data, as used in this disclosure, is a process whereby training examples are removed that interfere with convergence of a machine-learning model and/or process to a useful result. For instance, and without limitation, a training example may include an input and/or output value that is an outlier from typically encountered values, such that a machine-learning algorithm using the training example will be adapted to an unlikely amount as an input and/or output; a value that is more than a threshold number of standard deviations away from an average, mean, or expected value, for instance, may be eliminated. Alternatively or additionally, one or more training examples may be identified as having poor quality data, where "poor quality" is defined as having a signal to noise ratio below a threshold value.

As a non-limiting example, and with further reference to FIG. 5, images used to train an image classifier or other machine-learning model and/or process that takes images as inputs or generates images as outputs may be rejected if image quality is below a threshold value. For instance, and without limitation, computing device, processor, and/or module may perform blur detection, and eliminate one or more Blur detection may be performed, as a non-limiting example, by taking Fourier transform, or an approximation such as a Fast Fourier Transform (FFT) of the image and analyzing a distribution of low and high frequencies in the resulting frequency-domain depiction of the image; numbers of high-frequency values below a threshold level may indicate blurriness. As a further non-limiting example, detection of blurriness may be performed by convolving an image, a channel of an image, or the like with a Laplacian kernel; this may generate a numerical score reflecting a number of rapid changes in intensity shown in the image, such that a high score indicates clarity and a low score indicates blurriness. Blurriness detection may be performed using a gradient-based operator, which measures operators based on the gradient or first derivative of an image, based on the hypothesis that rapid changes indicate sharp edges in the image, and thus are indicative of a lower degree of blurriness. Blur detection may be performed using Wavelet-based operator, which takes advantage of the capability of coefficients of the discrete wavelet transform to describe the frequency and spatial content of images. Blur detection may be performed using statistics-based operators take advantage of several image statistics as texture descriptors in order to compute a focus level. Blur detection may be performed by using discrete cosine transform (DCT) coefficients in order to compute a focus level of an image from its frequency content.

Continuing to refer to FIG. 5, computing device, processor, and/or module may be configured to precondition one or more training examples. For instance, and without limitation, where a machine learning model and/or process has one or more inputs and/or outputs requiring, transmitting, or receiving a certain number of bits, samples, or other units of data, one or more training examples' elements to be used as or compared to inputs and/or outputs may be modified to have such a number of units of data. For instance, a computing device, processor, and/or module may convert a smaller number of units, such as in a low pixel count image, into a desired number of units, for instance by upsampling and interpolating. As a non-limiting example, a low pixel count image may have 100 pixels, however a desired number of pixels may be 128. Processor may interpolate the low pixel count image to convert the 100 pixels into 128 pixels. It should also be noted that one of ordinary skill in the art, upon reading this disclosure, would know the various methods to interpolate a smaller number of data units such as samples, pixels, bits, or the like to a desired number of such units. In some instances, a set of interpolation rules may be trained by sets of highly detailed inputs and/or outputs and corresponding inputs and/or outputs downsampled to smaller numbers of units, and a neural network or other machine learning model that is trained to predict interpolated pixel values using the training data. As a non-limiting example, a sample input and/or output, such as a sample picture, with sample-expanded data units (e.g., pixels added between the original pixels) may be input to a neural network or machine-learning model and output a pseudo replica sample-picture with dummy values assigned to pixels between the original pixels based on a set of interpolation rules. As a non-limiting example, in the context of an image classifier, a machine-learning model may have a set of interpolation rules trained by sets of highly detailed images and images that have been downsampled to smaller numbers of pixels, and a neural network or other machine learning model that is trained using those examples to predict interpolated pixel values in a facial picture context. As a result, an input with sample-expanded data units (the ones added between the original data units, with dummy values) may be run through a trained neural network and/or model, which may fill in values to replace the dummy values. Alternatively or additionally, processor, computing device, and/or module may utilize sample expander methods, a low-pass filter, or both. As used in this disclosure, a "low-pass filter" is a filter that passes signals with a frequency lower than a selected cutoff frequency and attenuates signals with frequencies higher than the cutoff frequency. The exact frequency response of the filter depends on the filter design. Computing device, processor, and/or module may use averaging, such as luma or chroma averaging in images, to fill in data units in between original data units.

In some embodiments, and with continued reference to FIG. 5, computing device, processor, and/or module may down-sample elements of a training example to a desired lower number of data elements. As a non-limiting example, a high pixel count image may have 256 pixels, however a desired number of pixels may be 128. Processor may down-sample the high pixel count image to convert the 256 pixels into 128 pixels. In some embodiments, processor may be configured to perform downsampling on data. Downsampling, also known as decimation, may include removing every Nth entry in a sequence of samples, all but every Nth entry, or the like, which is a process known as "compression," and may be performed, for instance by an N-sample compressor implemented using hardware or software. Anti-aliasing and/or anti-imaging filters, and/or low-pass filters, may be used to clean up side-effects of compression.

Still referring to FIG. 5, machine-learning module 500 may be configured to perform a lazy-learning process 520 and/or protocol, which may alternatively be referred to as a "lazy loading" or "call-when-needed" process and/or protocol, may be a process whereby machine learning is conducted upon receipt of an input to be converted to an output, by combining the input and training set to derive the algorithm to be used to produce the output on demand. For instance, an initial set of simulations may be performed to cover an initial heuristic and/or "first guess" at an output and/or relationship. As a non-limiting example, an initial heuristic may include a ranking of associations between inputs and elements of training data 504. Heuristic may include selecting some number of highest-ranking associations and/or training data 504 elements. Lazy learning may implement any suitable lazy learning algorithm, including without limitation a K-nearest neighbors algorithm, a lazy naïve Bayes algorithm, or the like; persons skilled in the art, upon reviewing the entirety of this disclosure, will be aware of various lazy-learning algorithms that may be applied to generate outputs as described in this disclosure, including without limitation lazy learning applications of machine-learning algorithms as described in further detail below.

Alternatively or additionally, and with continued reference to FIG. 5, machine-learning processes as described in this disclosure may be used to generate machine-learning models 524. A "machine-learning model," as used in this disclosure, is a data structure representing and/or instantiating a mathematical and/or algorithmic representation of a relationship between inputs and outputs, as generated using any machine-learning process including without limitation any process as described above, and stored in memory; an input is submitted to a machine-learning model 524 once created, which generates an output based on the relationship that was derived. For instance, and without limitation, a linear regression model, generated using a linear regression algorithm, may compute a linear combination of input data using coefficients derived during machine-learning processes to calculate an output datum. As a further non-limiting example, a machine-learning model 524 may be generated by creating an artificial neural network, such as a convolutional neural network comprising an input layer of nodes, one or more intermediate layers, and an output layer of nodes. Connections between nodes may be created via the process of "training" the network, in which elements from a training data 504 set are applied to the input nodes, a suitable training algorithm (such as Levenberg-Marquardt, conjugate gradient, simulated annealing, or other algorithms) is then used to adjust the connections and weights between nodes in adjacent layers of the neural network to produce the desired values at the output nodes. This process is sometimes referred to as deep learning.

Still referring to FIG. 5, machine-learning algorithms may include at least a supervised machine-learning process 528. At least a supervised machine-learning process 528, as defined herein, include algorithms that receive a training set relating a number of inputs to a number of outputs, and seek to generate one or more data structures representing and/or instantiating one or more mathematical relations relating inputs to outputs, where each of the one or more mathematical relations is optimal according to some criterion specified to the algorithm using some scoring function. For instance, a supervised learning algorithm may include inputs as described in this disclosure as inputs, outputs as described in this disclosure as outputs, and a scoring function representing a desired form of relationship to be detected between inputs and outputs; scoring function may, for instance, seek to maximize the probability that a given input and/or combination of elements inputs is associated with a given output to minimize the probability that a given input is not associated with a given output. Scoring function may be expressed as a risk function representing an "expected loss" of an algorithm relating inputs to outputs, where loss is computed as an error function representing a degree to which a prediction generated by the relation is incorrect when compared to a given input-output pair provided in training data 504. Persons skilled in the art, upon reviewing the entirety of this disclosure, will be aware of various possible variations of at least a supervised machine-learning process 528 that may be used to determine relation between inputs and outputs. Supervised machine-learning processes may include classification algorithms as defined above.

With further reference to FIG. 5, training a supervised machine-learning process may include, without limitation, iteratively updating coefficients, biases, weights based on an error function, expected loss, and/or risk function. For instance, an output generated by a supervised machine-learning model using an input example in a training example may be compared to an output example from the training example; an error function may be generated based on the comparison, which may include any error function suitable for use with any machine-learning algorithm described in this disclosure, including a square of a difference between one or more sets of compared values or the like. Such an error function may be used in turn to update one or more weights, biases, coefficients, or other parameters of a machine-learning model through any suitable process including without limitation gradient descent processes, least-squares processes, and/or other processes described in this disclosure. This may be done iteratively and/or recursively to gradually tune such weights, biases, coefficients, or other parameters. Updating may be performed, in neural networks, using one or more back-propagation algorithms. Iterative and/or recursive updates to weights, biases, coefficients, or other parameters as described above may be performed until currently available training data is exhausted and/or until a convergence test is passed, where a "convergence test" is a test for a condition selected as indicating that a model and/or weights, biases, coefficients, or other parameters thereof has reached a degree of accuracy. A convergence test may, for instance, compare a difference between two or more successive errors or error function values, where differences below a threshold amount may be taken to indicate convergence. Alternatively or additionally, one or more errors and/or error function values evaluated in training iterations may be compared to a threshold.

Still referring to FIG. 5, a computing device, processor, and/or module may be configured to perform method, method step, sequence of method steps and/or algorithm described in reference to this figure, in any order and with any degree of repetition. For instance, a computing device, processor, and/or module may be configured to perform a single step, sequence and/or algorithm repeatedly until a desired or commanded outcome is achieved; repetition of a step or a sequence of steps may be performed iteratively and/or recursively using outputs of previous repetitions as inputs to subsequent repetitions, aggregating inputs and/or outputs of repetitions to produce an aggregate result, reduction or decrement of one or more variables such as global variables, and/or division of a larger processing task into a set of iteratively addressed smaller processing tasks. A computing device, processor, and/or module may perform any step, sequence of steps, or algorithm in parallel, such as simultaneously and/or substantially simultaneously performing a step two or more times using two or more parallel threads, processor cores, or the like; division of tasks between parallel threads and/or processes may be performed according to any protocol suitable for division of tasks between iterations. Persons skilled in the art, upon reviewing the entirety of this disclosure, will be aware of various ways in which steps, sequences of steps, processing tasks, and/or data may be subdivided, shared, or otherwise dealt with using iteration, recursion, and/or parallel processing.

Further referring to FIG. 5, machine learning processes may include at least an unsupervised machine-learning processes 532. An unsupervised machine-learning process, as used herein, is a process that derives inferences in datasets without regard to labels; as a result, an unsupervised machine-learning process may be free to discover any structure, relationship, and/or correlation provided in the data. Unsupervised processes may not require a response variable; unsupervised processes may be used to find interesting patterns and/or inferences between variables, to determine a degree of correlation between two or more variables, or the like.

Still referring to FIG. 5, machine-learning module 500 may be designed and configured to create a machine-learning model 524 using techniques for development of linear regression models. Linear regression models may include ordinary least squares regression, which aims to minimize the square of the difference between predicted outcomes and actual outcomes according to an appropriate norm for measuring such a difference (e.g. a vector-space distance norm); coefficients of the resulting linear equation may be modified to improve minimization. Linear regression models may include ridge regression methods, where the function to be minimized includes the least-squares function plus term multiplying the square of each coefficient by a scalar amount to penalize large coefficients. Linear regression models may include least absolute shrinkage and selection operator (LASSO) models, in which ridge regression is combined with multiplying the least-squares term by a factor of 1 divided by double the number of samples. Linear regression models may include a multi-task lasso model wherein the norm applied in the least-squares term of the lasso model is the Frobenius norm amounting to the square root of the sum of squares of all terms. Linear regression models may include the elastic net model, a multi-task elastic net model, a least angle regression model, a LARS lasso model, an orthogonal matching pursuit model, a Bayesian regression model, a logistic regression model, a stochastic gradient descent model, a perceptron model, a passive aggressive algorithm, a robustness regression model, a Huber regression model, or any other suitable model that may occur to persons skilled in the art upon reviewing the entirety of this disclosure. Linear regression models may be generalized in an embodiment to polynomial regression models, whereby a polynomial equation (e.g. a quadratic, cubic or higher-order equation) providing a best predicted output/actual output fit is sought; similar methods to those described above may be applied to minimize error functions, as will be apparent to persons skilled in the art upon reviewing the entirety of this disclosure.

Continuing to refer to FIG. 5, machine-learning algorithms may include, without limitation, linear discriminant analysis. Machine-learning algorithm may include quadratic discriminant analysis. Machine-learning algorithms may include kernel ridge regression. Machine-learning algorithms may include support vector machines, including without limitation support vector classification-based regression processes. Machine-learning algorithms may include stochastic gradient descent algorithms, including classification and regression algorithms based on stochastic gradient descent. Machine-learning algorithms may include nearest neighbors algorithms. Machine-learning algorithms may include various forms of latent space regularization such as variational regularization. Machine-learning algorithms may include Gaussian processes such as Gaussian Process Regression. Machine-learning algorithms may include cross-decomposition algorithms, including partial least squares and/or canonical correlation analysis. Machine-learning algorithms may include naïve Bayes methods. Machine-learning algorithms may include algorithms based on decision trees, such as decision tree classification or regression algorithms. Machine-learning algorithms may include ensemble methods such as bagging meta-estimator, forest of randomized trees, AdaBoost, gradient tree boosting, and/or voting classifier methods. Machine-learning algorithms may include neural net algorithms, including convolutional neural net processes.

Still referring to FIG. 5, a machine-learning model and/or process may be deployed or instantiated by incorporation into a program, apparatus, system and/or module. For instance, and without limitation, a machine-learning model, neural network, and/or some or all parameters thereof may be stored and/or deployed in any memory or circuitry. Parameters such as coefficients, weights, and/or biases may be stored as circuit-based constants, such as arrays of wires and/or binary inputs and/or outputs set at logic "1" and "0" voltage levels in a logic circuit to represent a number according to any suitable encoding system including twos complement or the like or may be stored in any volatile and/or non-volatile memory. Similarly, mathematical operations and input and/or output of data to or from models, neural network layers, or the like may be instantiated in hardware circuitry and/or in the form of instructions in firmware, machine-code such as binary operation code instructions, assembly language, or any higher-order programming language. Any technology for hardware and/or software instantiation of memory, instructions, data structures, and/or algorithms may be used to instantiate a machine-learning process and/or model, including without limitation any combination of production and/or configuration of non-reconfigurable hardware elements, circuits, and/or modules such as without limitation ASICs, production and/or configuration of reconfigurable hardware elements, circuits, and/or modules such as without limitation FPGAS, production and/or of non-reconfigurable and/or configuration non-rewritable memory elements, circuits, and/or modules such as without limitation non-rewritable ROM, production and/or configuration of reconfigurable and/or rewritable memory elements, circuits, and/or modules such as without limitation rewritable ROM or other memory technology described in this disclosure, and/or production and/or configuration of any computing device and/or component thereof as described in this disclosure. Such deployed and/or instantiated machine-learning model and/or algorithm may receive inputs from any other process, module, and/or component described in this disclosure, and produce outputs to any other process, module, and/or component described in this disclosure.

Continuing to refer to FIG. 5, any process of training, retraining, deployment, and/or instantiation of any machine-learning model and/or algorithm may be performed and/or repeated after an initial deployment and/or instantiation to correct, refine, and/or improve the machine-learning model and/or algorithm. Such retraining, deployment, and/or instantiation may be performed as a periodic or regular process, such as retraining, deployment, and/or instantiation at regular elapsed time periods, after some measure of volume such as a number of bytes or other measures of data processed, a number of uses or performances of processes described in this disclosure, or the like, and/or according to a software, firmware, or other update schedule. Alternatively or additionally, retraining, deployment, and/or instantiation may be event-based, and may be triggered, without limitation, by user inputs indicating sub-optimal or otherwise problematic performance and/or by automated field testing and/or auditing processes, which may compare outputs of machine-learning models and/or algorithms, and/or errors and/or error functions thereof, to any thresholds, convergence tests, or the like, and/or may compare outputs of processes described herein to similar thresholds, convergence tests or the like. Event-based retraining, deployment, and/or instantiation may alternatively or additionally be triggered by receipt and/or generation of one or more new training examples; a number of new training examples may be compared to a preconfigured threshold, where exceeding the preconfigured threshold may trigger retraining, deployment, and/or instantiation.

Still referring to FIG. 5, retraining and/or additional training may be performed using any process for training described above, using any currently or previously deployed version of a machine-learning model and/or algorithm as a starting point. Training data for retraining may be collected, preconditioned, sorted, classified, sanitized or otherwise processed according to any process described in this disclosure. Training data may include, without limitation, training examples including inputs and correlated outputs used, received, and/or generated from any version of any system, module, machine-learning model or algorithm, apparatus, and/or method described in this disclosure; such examples may be modified and/or labeled according to user feedback or other processes to indicate desired results, and/or may have actual or measured results from a process being modeled and/or predicted by system, module, machine-learning model or algorithm, apparatus, and/or method as "desired" results to be compared to outputs for training processes as described above.

Redeployment may be performed using any reconfiguring and/or rewriting of reconfigurable and/or rewritable circuit and/or memory elements; alternatively, redeployment may be performed by production of new hardware and/or software components, circuits, instructions, or the like, which may be added to and/or may replace existing hardware and/or software components, circuits, instructions, or the like.

Further referring to FIG. 5, one or more processes or algorithms described above may be performed by at least a dedicated hardware unit. A "dedicated hardware unit," for the purposes of this figure, is a hardware component, circuit, or the like, aside from a principal control circuit and/or processor performing method steps as described in this disclosure, that is specifically designated or selected to perform one or more specific tasks and/or processes described in reference to this figure, such as without limitation preconditioning and/or sanitization of training data and/or training a machine-learning algorithm and/or model. A dedicated hardware unit may include, without limitation, a hardware unit that can perform iterative or massed calculations, such as matrix-based calculations to update or tune parameters, weights, coefficients, and/or biases of machine-learning models and/or neural networks, efficiently using pipelining, parallel processing, or the like; such a hardware unit may be optimized for such processes by, for instance, including dedicated circuitry for matrix and/or signal processing operations that includes, e.g., multiple arithmetic and/or logical circuit units such as multipliers and/or adders that can act simultaneously and/or in parallel or the like. Such dedicated hardware units may include, without limitation, graphical processing units (GPUs), dedicated signal processing modules, FPGA or other reconfigurable hardware that has been configured to instantiate parallel processing units for one or more specific tasks, or the like, A computing device, processor, apparatus, or module may be configured to instruct one or more dedicated hardware units to perform one or more operations described herein, such as evaluation of model and/or algorithm outputs, one-time or iterative updates to parameters, coefficients, weights, and/or biases, and/or any other operations such as vector and/or matrix operations as described in this disclosure.

Figure 6:
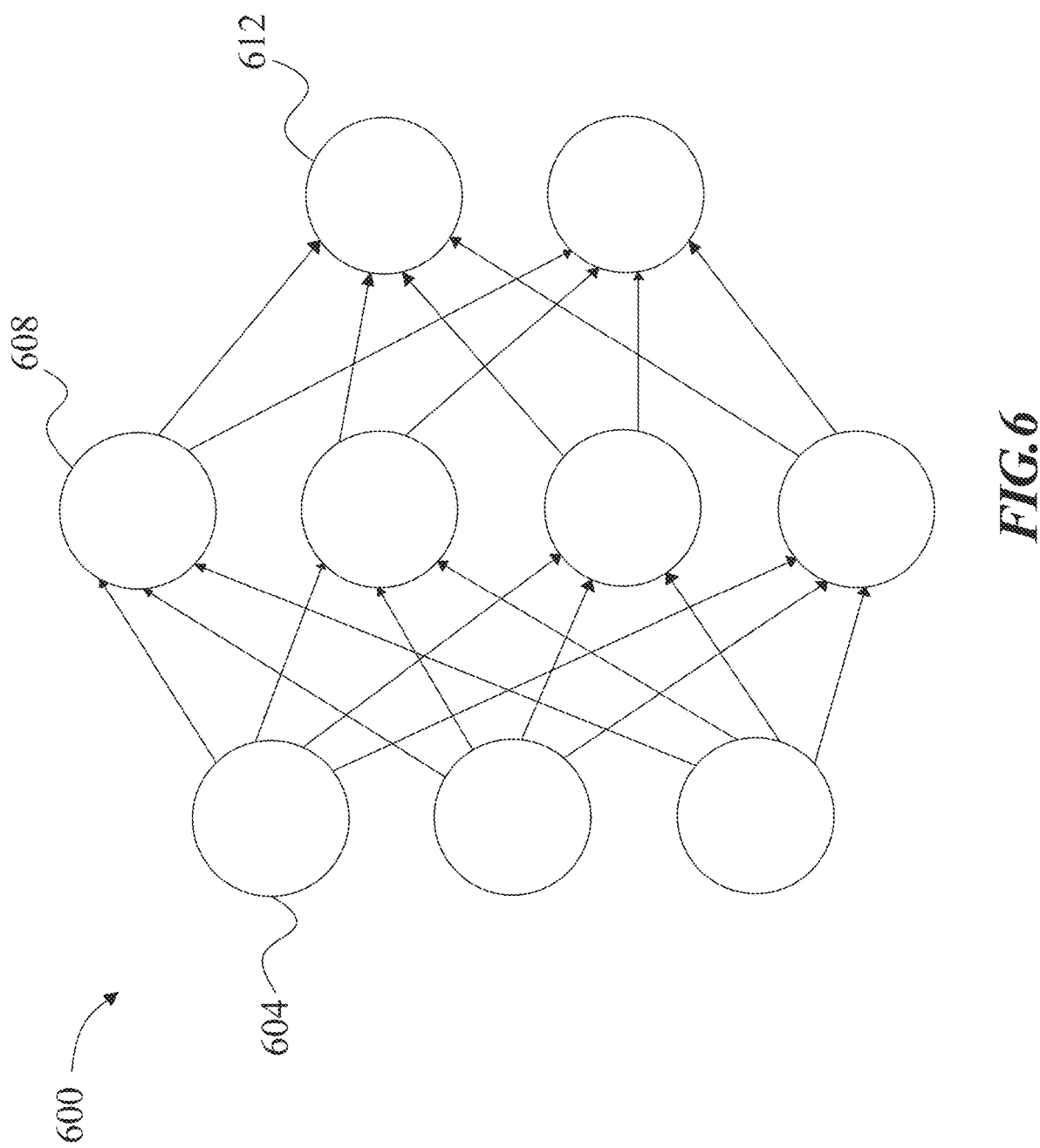
FIG. 6 is a diagram of an exemplary embodiment of neural network.

Referring now to FIG. 6, an exemplary embodiment of neural network 600 is illustrated. A neural network 600 also known as an artificial neural network, is a network of "nodes," or data structures having one or more inputs, one or more outputs, and a function determining outputs based on inputs. Such nodes may be organized in a network, such as without limitation a convolutional neural network, including an input layer of nodes 604, one or more intermediate layers 608, and an output layer of nodes 612. Connections between nodes may be created via the process of "training" the network, in which elements from a training dataset are applied to the input nodes, a suitable training algorithm (such as Levenberg-Marquardt, conjugate gradient, simulated annealing, or other algorithms) is then used to adjust the connections and weights between nodes in adjacent layers of the neural network to produce the desired values at the output nodes. This process is sometimes referred to as deep learning. Connections may run solely from input nodes toward output nodes in a "feed-forward" network or may feed outputs of one layer back to inputs of the same or a different layer in a "recurrent network." As a further non-limiting example, a neural network may include a convolutional neural network comprising an input layer of nodes, one or more intermediate layers, and an output layer of nodes. A "convolutional neural network," as used in this disclosure, is a neural network in which at least one hidden layer is a convolutional layer that convolves inputs to that layer with a subset of inputs known as a "kernel," along with one or more additional layers such as pooling layers, fully connected layers, and the like.

Figure 7:
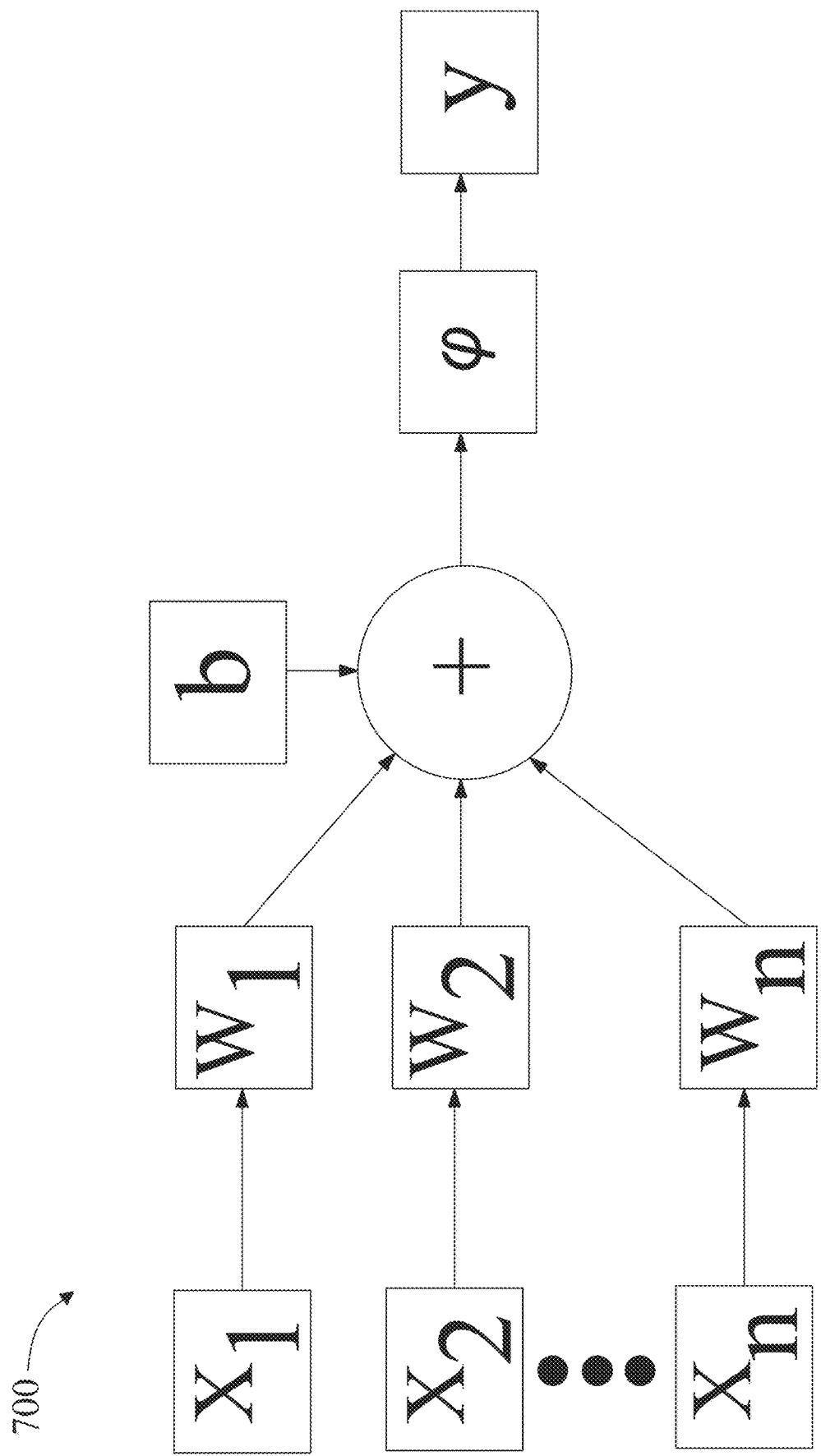
FIG. 7 is a diagram of an exemplary embodiment of a node of a neural network.

Referring now to FIG. 7, an exemplary embodiment of a node 700 of a neural network is illustrated. A node may include, without limitation, a plurality of inputs $x_i$ that may receive numerical values from inputs to a neural network containing the node and/or from other nodes. Node may perform one or more activation functions to produce its output given one or more inputs, such as without limitation computing a binary step function comparing an input to a threshold value and outputting either a logic 1 or logic 0 output or something equivalent, a linear activation function whereby an output is directly proportional to the input, and/or a non-linear activation function, wherein the output is not proportional to the input. Non-linear activation functions may include, without limitation, a sigmoid function of the form $$f(x) = \frac{1}{1 - e^{-x}}$$

given input x, a tan h (hyperbolic tangent) function, of the form $$\frac{e^x - e^{-x}}{e^x + e^{-x}},$$

a tan h derivative function such as $f(x)=\tan h^2(x)$, a rectified linear unit function such as $f(x)=\max (0, x)$, a "leaky" and/or "parametric" rectified linear unit function such as $f(x)=\max (ax, x)$ for some a, an exponential linear units function such as $$f(x) = \begin{cases} x & \text{for } x \geq 0 \\ \alpha(e^x - 1) & \text{for } x < 0 \end{cases}$$

for some value of α (this function may be replaced and/or weighted by its own derivative in some embodiments), a softmax function such as $$f(x_i) = \frac{e^x}{\sum_i x_i}$$

where the inputs to an instant layer are $x_i$, a swish function such as $f(x)=x*\text{sigmoid}(x)$, a Gaussian error linear unit function such as $f(x)=a(1+\tan h(\sqrt{2/\pi}(x+bx^r)))$ for some values of a, b, and r, and/or a scaled exponential linear unit function such as $$f(x) = \lambda \begin{cases} \alpha(e^x - 1) & \text{for } x < 0 \\ x & \text{for } x \geq 0 \end{cases}.$$

Fundamentally, there is no limit to the nature of functions of inputs $x_i$ that may be used as activation functions. As a non-limiting and illustrative example, node may perform a weighted sum of inputs using weights $w_i$, that are multiplied by respective inputs $x_i$. Additionally or alternatively, a bias b may be added to the weighted sum of the inputs such that an offset is added to each unit in the neural network layer that is independent of the input to the layer. The weighted sum may then be input into a function φ, which may generate one or more outputs y. Weight $w_i$ applied to an input $x_i$ may indicate whether the input is "excitatory," indicating that it has strong influence on the one or more outputs y, for instance by the corresponding weight having a large numerical value, and/or a "inhibitory," indicating it has a weak effect influence on the one more inputs y, for instance by the corresponding weight having a small numerical value. The values of weights $w_i$ may be determined by training a neural network using training data, which may be performed using any suitable process as described above.

It is to be noted that any one or more of the aspects and embodiments described herein may be conveniently implemented using one or more machines (e.g., one or more computing devices that are utilized as a user computing device for an electronic document, one or more server devices, such as a document server, etc.) programmed according to the teachings of the present specification, as will be apparent to those of ordinary skill in the computer art. Appropriate software coding can readily be prepared by skilled programmers based on the teachings of the present disclosure, as will be apparent to those of ordinary skill in the software art. Aspects and implementations discussed above employing software and/or software modules may also include appropriate hardware for assisting in the implementation of the machine executable instructions of the software and/or software module.

Such software may be a computer program product that employs a machine-readable storage medium. A machine-readable storage medium may be any medium that is capable of storing and/or encoding a sequence of instructions for execution by a machine (e.g., a computing device) and that causes the machine to perform any one of the methodologies and/or embodiments described herein. Examples of a machine-readable storage medium include, but are not limited to, a magnetic disk, an optical disc (e.g., CD, CD-R, DVD, DVD-R, etc.), a magneto-optical disk, a read-only memory "ROM" device, a random access memory "RAM" device, a magnetic card, an optical card, a solid-state memory device, an EPROM, an EEPROM, and any combinations thereof. A machine-readable medium, as used herein, is intended to include a single medium as well as a collection of physically separate media, such as, for example, a collection of compact discs or one or more hard disk drives in combination with a computer memory. As used herein, a machine-readable storage medium does not include transitory forms of signal transmission.

Such software may also include information (e.g., data) carried as a data signal on a data carrier, such as a carrier wave. For example, machine-executable information may be included as a data-carrying signal embodied in a data carrier in which the signal encodes a sequence of instruction, or portion thereof, for execution by a machine (e.g., a computing device) and any related information (e.g., data structures and data) that causes the machine to perform any one of the methodologies and/or embodiments described herein.

Examples of a computing device include, but are not limited to, an electronic book reading device, a computer workstation, a terminal computer, a server computer, a handheld device (e.g., a tablet computer, a smartphone, etc.), a web appliance, a network router, a network switch, a network bridge, any machine capable of executing a sequence of instructions that specify an action to be taken by that machine, and any combinations thereof. In one example, a computing device may include and/or be included in a kiosk.

Figure 8:
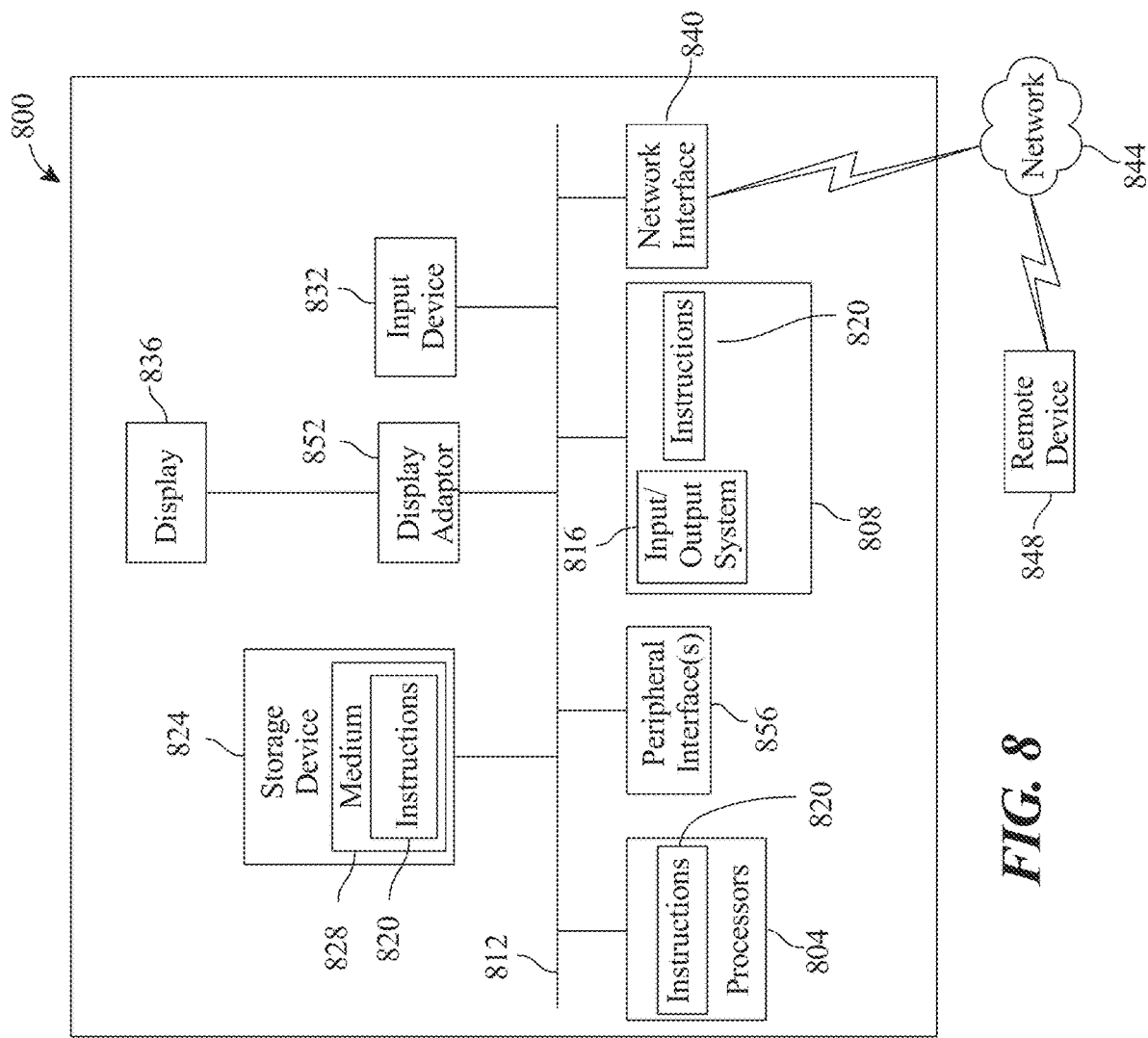
FIG. 8 is a block diagram of a computing system that can be used to implement any one or more of the methodologies disclosed herein and any one or more portions thereof.

FIG. 8 shows a diagrammatic representation of one embodiment of a computing device in the exemplary form of a computer system 800 within which a set of instructions for causing a control system to perform any one or more of the aspects and/or methodologies of the present disclosure may be executed. It is also contemplated that multiple computing devices may be utilized to implement a specially configured set of instructions for causing one or more of the devices to perform any one or more of the aspects and/or methodologies of the present disclosure. Computer system 800 includes a processor 804 and a memory 808 that communicate with each other, and with other components, via a bus 812. Bus 812 may include any of several types of bus structures including, but not limited to, a memory bus, a memory controller, a peripheral bus, a local bus, and any combinations thereof, using any of a variety of bus architectures.

Processor 804 may include any suitable processor, such as without limitation a processor incorporating logical circuitry for performing arithmetic and logical operations, such as an arithmetic and logic unit (ALU), which may be regulated with a state machine and directed by operational inputs from memory and/or sensors; processor 804 may be organized according to Von Neumann and/or Harvard architecture as a non-limiting example. Processor 804 may include, incorporate, and/or be incorporated in, without limitation, a microcontroller, microprocessor, digital signal processor (DSP), Field Programmable Gate Array (FPGA), Complex Programmable Logic Device (CPLD), Graphical Processing Unit (GPU), general purpose GPU, Tensor Processing Unit (TPU), analog or mixed signal processor, Trusted Platform Module (TPM), a floating point unit (FPU), system on module (SOM), and/or system on a chip (SoC).

Memory 808 may include various components (e.g., machine-readable media) including, but not limited to, a random-access memory component, a read only component, and any combinations thereof. In one example, a basic input/output system 816 (BIOS), including basic routines that help to transfer information between elements within computer system 800, such as during start-up, may be stored in memory 808. Memory 808 may also include (e.g., stored on one or more machine-readable media) instructions (e.g., software) 820 embodying any one or more of the aspects and/or methodologies of the present disclosure. In another example, memory 808 may further include any number of program modules including, but not limited to, an operating system, one or more application programs, other program modules, program data, and any combinations thereof.

Computer system 800 may also include a storage device 824. Examples of a storage device (e.g., storage device 824) include, but are not limited to, a hard disk drive, a magnetic disk drive, an optical disc drive in combination with an optical medium, a solid-state memory device, and any combinations thereof. Storage device 824 may be connected to bus 812 by an appropriate interface (not shown). Example interfaces include, but are not limited to, SCSI, advanced technology attachment (ATA), serial ATA, universal serial bus (USB), IEEE 1394 (FIREWIRE), and any combinations thereof. In one example, storage device 824 (or one or more components thereof) may be removably interfaced with computer system 800 (e.g., via an external port connector (not shown)). Particularly, storage device 824 and an associated machine-readable medium 828 may provide nonvolatile and/or volatile storage of machine-readable instructions, data structures, program modules, and/or other data for computer system 800. In one example, software 820 may reside, completely or partially, within machine-readable medium 828. In another example, software 820 may reside, completely or partially, within processor 804.

Computer system 800 may also include an input device 832. In one example, a user of computer system 800 may enter commands and/or other information into computer system 800 via input device 832. Examples of an input device 832 include, but are not limited to, an alpha-numeric input device (e.g., a keyboard), a pointing device, a joystick, a gamepad, an audio input device (e.g., a microphone, a voice response system, etc.), a cursor control device (e.g., a mouse), a touchpad, an optical scanner, a video capture device (e.g., a still camera, a video camera), a touchscreen, and any combinations thereof. Input device 832 may be interfaced to bus 812 via any of a variety of interfaces (not shown) including, but not limited to, a serial interface, a parallel interface, a game port, a USB interface, a FIREWIRE interface, a direct interface to bus 812, and any combinations thereof. Input device 832 may include a touch screen interface that may be a part of or separate from display 836, discussed further below. Input device 832 may be utilized as a user selection device for selecting one or more graphical representations in a graphical interface as described above.

A user may also input commands and/or other information to computer system 800 via storage device 824 (e.g., a removable disk drive, a flash drive, etc.) and/or network interface device 840. A network interface device, such as network interface device 840, may be utilized for connecting computer system 800 to one or more of a variety of networks, such as network 844, and one or more remote devices 848 connected thereto. Examples of a network interface device include, but are not limited to, a network interface card (e.g., a mobile network interface card, a LAN card), a modem, and any combination thereof. Examples of a network include, but are not limited to, a wide area network (e.g., the Internet, an enterprise network), a local area network (e.g., a network associated with an office, a building, a campus or other relatively small geographic space), a telephone network, a data network associated with a telephone/voice provider (e.g., a mobile communications provider data and/or voice network), a direct connection between two computing devices, and any combinations thereof. A network, such as network 844, may employ a wired and/or a wireless mode of communication. In general, any network topology may be used. Information (e.g., data, software 820, etc.) may be communicated to and/or from computer system 800 via network interface device 840.

Computer system 800 may further include a video display adapter 852 for communicating a displayable image to a display device, such as display device 836. Examples of a display device include, but are not limited to, a liquid crystal display (LCD), a cathode ray tube (CRT), a plasma display, a light emitting diode (LED) display, and any combinations thereof. Display adapter 852 and display device 836 may be utilized in combination with processor 804 to provide graphical representations of aspects of the present disclosure. In addition to a display device, computer system 800 may include one or more other peripheral output devices including, but not limited to, an audio speaker, a printer, and any combinations thereof. Such peripheral output devices may be connected to bus 812 via a peripheral interface 856. Examples of a peripheral interface include, but are not limited to, a serial port, a USB connection, a FIREWIRE connection, a parallel connection, and any combinations thereof.

The foregoing has been a detailed description of illustrative embodiments of the invention. Various modifications and additions can be made without departing from the spirit and scope of this invention. Features of each of the various embodiments described above may be combined with features of other described embodiments as appropriate in order to provide a multiplicity of feature combinations in associated new embodiments. Furthermore, while the foregoing describes a number of separate embodiments, what has been described herein is merely illustrative of the application of the principles of the present invention. Additionally, although particular methods herein may be illustrated and/or described as being performed in a specific order, the ordering is highly variable within ordinary skill to achieve methods, systems, and software according to the present disclosure. Accordingly, this description is meant to be taken only by way of example, and not to otherwise limit the scope of this invention.

Exemplary embodiments have been disclosed above and illustrated in the accompanying drawings. It will be understood by those skilled in the art that various changes, omissions and additions may be made to that which is specifically disclosed herein without departing from the spirit and scope of the present invention.

What is claimed is:

1. A system of dynamic user interface generation, wherein the system comprises:
    a computing device, wherein the computing device is configured to:
        configure, using an initial display data structure, a remote device to display a user interface having a first input field;
        capture user interaction data using the first input field and from an engagement module comprising a dispersive signal touch screen communicatively connected to the user interface, wherein the user interaction data comprises subtle details of user interactions with the user interface, wherein the user interactions comprise at least a pressure applied by a user during touching contact with the dispersive signal touch screen;
        prioritize the user interaction data as a function of a user interaction data extraction template generated by the computing device;
        receive server feedback data through a communication module wherein the server feedback data comprises at least an update to a recovery program and data validation;
        determine a current user interface state as a function of the captured user interaction data and the server feedback data;
        select an optimal user interface state as a function of the prioritized user interaction data and the current user interface state, wherein the selecting comprises:
            receiving training data, wherein the training data correlates the user interaction data and the server feedback data to states of user interfaces;
            training a user interface adaptation machine-learning model as a function of the training data; and
            selecting the optimal user interface state as the function of the prioritized user interaction data and the server feedback data, wherein the optimal user interface state includes at least an optimal event action; and
        generate, as a function of the selected optimal user interface state, the captured user interaction data, and the current user interface state, an updated display data structure, wherein:
            the updated display data structure includes at least a second input field associated with the at least the optimal event action; and
            the updated display data structure configures the remote device to display the at least the second input field and to perform the at least the optimal event action upon activation of the at least the second input field.

2. The system of claim 1, wherein the configuring of the remote device further includes populating the first input field with default data based on user's previous interactions stored in the initial display data structure.

3. The system of claim 1, wherein the computing device is further configured to classify the user interaction data to an interaction type.

4. The system of claim 1, wherein the computing device is further configured to generate the user interaction data extraction template as a function of the predicted optimal user interface state, wherein the user interaction data extraction template includes the at least the second input field.

5. The system of claim 1, wherein selecting the optimal user interface state further comprises selection of a user interface template from a plurality of interface layouts in a layout network.

6. The system of claim 1 further configured to:
    receive an element of user feedback; and
    update the user interface adaptation machine-learning model using the element of user feedback.

7. The system of claim 1, wherein the computing device is further configured to select the optimal user interface state based on both the user interaction data and the server feedback data, with the optimal user interface state including at least one optimal event action that maximizes a defined user engagement metric.

8. The system of claim 1, wherein selecting the optimal user interface state further comprises:
    identifying a navigation strategy to enhance user engagement; and
    selecting the optimal user interface state based on the navigation strategy.

9. The system of claim 1, wherein the optimal event action associated with the at least the second input field is determined based on a user behavior pattern identified from the user interaction data and the server feedback data, leading to a tailored user interface experience that enhances user engagement and efficiency.

10. The system of claim 1, wherein the communication module facilitates a dynamic operation of the system which allows the system to adapt and evolve in response to server-side updates and ongoing user interactions.

11. A method of dynamic user interface generation wherein the method comprises:
    configuring, at a computing device, using an initial display data structure, a remote device to display a user interface having an input field;
    capturing, through the first input field, user interaction data, and incorporating an engagement module comprising a dispersive signal touch screen communicatively connected to the user interface, wherein the user interaction data comprises subtle details of user interactions with the user interface, wherein the user interactions comprise at least a pressure applied by a user during touching contact with the dispersive signal touch screen;
    prioritizing, at the computing device, the user interaction data as a function of a user interaction data extraction template generated by the computing device;
    receiving, at the computing device, server feedback data wherein the server feedback data comprises at least an update to a recovery program and data validation;
    determining, at the computing device, a current user interface state as a function of the user interaction data and the server feedback data;
    selecting, at the computing device, an optimal user interface state as a function of the prioritized user interaction data and the current user interface state, wherein the selecting further comprises:

receiving training data, wherein the training data correlates the user interaction data and the server feedback data to states of user interfaces;

training a user interface adaptation machine learning process with the training data; and selecting the optimal user interface state as the function of the prioritized user interaction data and the server feedback data, wherein the optimal user interface state includes at least an optimal event action; and generating, at the computing device, an updated display data structure for the user, as a function of the selected optimal user interface state, the captured user interaction data, and the current user interface state further comprises:

including, in the updated display data structure at the computing device at least a second input field associated with the at least the optimal event action; and configuring, using the updated display data structure at the computing device, the remote device to display at least the second input field and to perform the at least the optimal event action upon activation of the at least the second input field.

12. The method of claim 11, by the computing device, further comprises:

capturing feasibility training data, wherein the feasibility training data comprises a plurality of entries correlating the user interaction data with interface state score;

training, with the feasibility training data, a feasibility machine-learning model;

determining a feasibility quantifier as a function of the feasibility machine-learning model and the user interaction data.

13. The method of claim 11, by the computing device, further comprises:

receiving a constraint training data for a machine-learning model;

identifying a plurality of constraints as a function of the user interaction data; and calculating effect of the constraints on the predicted optimal user interface state.

14. The method of claim 11, wherein selecting the optimal user interface state further comprises using a governor module to rank the states of the user interfaces towards improving user interaction.

15. The method of claim 11, wherein generating the optimal user interface state further comprises performing linear optimization and mixed integer optimization by the computing device.

16. The method of claim 11, wherein a governor module includes a loss function and generating the optimal user interface state further comprises minimizing the loss function by the computing device.

17. The method of claim 16, wherein generating the optimal user interface state further comprises determining a solution set including a plurality of user interface states with regard to average user engagement time.

18. The method of claim 11, wherein generating an output of scoring candidate user interface state according to at least a user satisfaction criterion further comprises scoring with regarding to difference between an expected interaction time and an expected task completion time.

19. The method of claim 11, wherein selecting the optimal user interface state further comprises generating a user interface adjustment instruction set, wherein a first interface element is prioritized as a function of an optimized objective function.

20. The method of claim 11, further comprising:

using a fuzzy set machine-learning model by the computing device to further process the user interaction data, wherein the fuzzy set machine-learning model comprises:

categorizing the user interaction data into fuzzy sets;

enabling smoother transition of the user interface states during the update of the display data structure; and enhancing adaptability and responsiveness of the user interface.

* * * * *